US012732062B2

(12) United States Patent
Kim et al.

(10) Patent No.: US 12,732,062 B2
(45) Date of Patent: Sep. 8, 2026

(54) DRIVING DEVICE INCLUDING A CLUTCH WITH A MOVEABLE MEMBER COUPLEABLE AND DECOUPLEABLE FROM A ROTOR ACCORDING TO OPERATION OF CLOTHING TREATMENT DEVICE AND CLOTHING TREATMENT DEVICE INCLUDING THE DRIVING DEVICE

(71) Applicant: Samsung Electronics Co., Ltd., Suwon-si (KR)

(72) Inventors: Junseok Kim, Suwon-si (KR); Hyungyu Kim, Suwon-si (KR); Minyoung Son, Suwon-si (KR); Sukwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 526 days.

(21) Appl. No.: 18/094,625

(22) Filed: Jan. 9, 2023

(65) Prior Publication Data

US 2023/0223816 A1 Jul. 13, 2023

Related U.S. Application Data

(63) Continuation of application No. PCT/KR2022/021197, filed on Dec. 23, 2022.

(30) Foreign Application Priority Data

Jan. 10, 2022 (KR) ........................ 10-2022-0003332
Aug. 4, 2022 (KR) ........................ 10-2022-0097600

(51) Int. Cl.
*H02K 7/108* (2006.01)
*D06F 37/30* (2020.01)
(Continued)

(52) U.S. Cl.
CPC ........... *H02K 7/108* (2013.01); *D06F 37/304* (2013.01); *H02K 5/24* (2013.01); *H02K 21/22* (2013.01)

(58) Field of Classification Search
CPC ............. H02K 1/2791; H02K 1/27915; H02K 1/2792; H02K 7/10; H02K 7/112;
(Continued)

(56) References Cited

U.S. PATENT DOCUMENTS 3,427,485 A 2/1969 Dotto
5,887,458 A 3/1999 Bae
(Continued)

FOREIGN PATENT DOCUMENTS

CN 103427552 B 7/2017
CN 107287828 A * 10/2017 ........... D06F 37/304
(Continued)

OTHER PUBLICATIONS

Hu, Machine Translation of CN208562866, Mar. 2019 (Year: 2019).*
(Continued)

*Primary Examiner* — Eric Johnson
(74) *Attorney, Agent, or Firm* — STAAS & HALSEY LLP

(57) ABSTRACT

A driving device including a stator; a rotor including a rotor frame and provided to be rotatable about a rotational axis of a clothing treatment device through interaction with the stator; and a clutch including a movable member configured to slide along the rotational axis to be selectively coupled to the rotor according to an operation mode of the clothing treatment device. The rotor frame may include a plurality of holes, and a plurality of coupling protrusions protruding toward the clutch so as to be coupled with the movable member when the movable member is slid to be coupled to the rotor. The plurality of coupling protrusions are integrally
(Continued)

formed with the rotor frame and punched out of the rotor frame to form the plurality of holes.

19 Claims, 24 Drawing Sheets

(51) Int. Cl.
*H02K 5/24* (2006.01)
*H02K 21/22* (2006.01)
*H02K 21/24* (2006.01)

(58) Field of Classification Search
CPC ...... H02K 7/1125; H02K 7/116; H02K 7/108; H02K 7/1085; H02K 7/11; H02K 21/22; D06F 37/304; D06F 37/36
See application file for complete search history.

(56) References Cited

U.S. PATENT DOCUMENTS 6,332,343 B1 12/2001 Koketsu et al.
7,562,542 B2 7/2009 Choi
8,450,898 B2 * 5/2013 Sears ..................... H02K 3/522 310/194
11,208,751 B2 12/2021 Hong et al.
2004/0139768 A1 7/2004 Kim et al.
2005/0166643 A1 8/2005 Cho et al.
2007/0138881 A1 * 6/2007 Ichizaki ................... H02K 7/10 310/90
2015/0107382 A1 4/2015 Chang
2015/0152583 A1 6/2015 Chang
2016/0108574 A1 4/2016 Liu et al.
2018/0323691 A1 * 11/2018 Nakano .................. H02K 1/146
2020/0232143 A1 * 7/2020 Sonoda ................... D06F 33/00
2021/0040672 A1 2/2021 Hu et al.
2021/0140089 A1 * 5/2021 Chupka .................... H02K 7/12

FOREIGN PATENT DOCUMENTS

CN 206736566 U 12/2017
CN 208562866 U * 3/2019 ........... D06F 37/304
DE 1 638 456 8/1970
EP 1 589 864 B1 2/2011
EP 3 831 999 A1 6/2021
JP 10-2005-0060677 6/2005
JP 2005-169126 6/2005
KR 2002-0058548 7/2002
KR 10-0378655 3/2003
KR 20030073850 A * 9/2003 ........... D06F 37/304
KR 10-2006-0044096 5/2006
KR 10-2006-0084463 7/2006
KR 20060084463 A * 7/2006
KR 10-1646706 8/2016
KR 10-2018-0085023 7/2018
KR 10-1885203 8/2018
KR 10-2019-0063197 6/2019
KR 10-2019-0088634 7/2019
KR 10-2020-0089604 7/2020
KR 10-2020-0106555 9/2020
KR 10-2021-0083031 7/2021
WO WO-2014132364 A1 * 9/2014 ........... H02K 11/215

OTHER PUBLICATIONS

Ahn, Machine Translation of KR20060084463, Jul. 2006 (Year: 2006).*
Chen, Machine Translation of CN107287828, Oct. 2017 (Year: 2017).*
Ahn, Machine Translation of KR20030073850, Sep. 2003 (Year: 2003).*
Urabe et al., Machine Translation of WO2014132364, Sep. 2014 (Year: 2014).*
International Search Report dated Mar. 24, 2023 in International Patent Application No. PCT/KR2022/021197.
PCT/ISA/237 dated Mar. 24, 2023 in International Patent Application No. PCT/KR2022/021197.
Extended European Search Report dated Nov. 10, 2025 issued in European Patent Application No. 22919079.8.
Supplementary European Search Report dated Feb. 2, 2026, issued European Patent Application No. 22 91 9079.

* cited by examiner

R
260
262
261b
265
261a
240
245
240b
230a
230
240a
231
232
235a
235
W
V
U
261
261a
261b

DRIVING DEVICE INCLUDING A CLUTCH WITH A MOVEABLE MEMBER COUPLEABLE AND DECOUPLEABLE FROM A ROTOR ACCORDING TO OPERATION OF CLOTHING TREATMENT DEVICE AND CLOTHING TREATMENT DEVICE INCLUDING THE DRIVING DEVICE

CROSS-REFERENCE TO RELATED APPLICATION(S)

This application is a continuation application of International Application No. PCT/KR2022/021197 designating the United States, filed on Dec. 23, 2022, in the Korean Intellectual Property Receiving Office, which claims priority from Korean Patent Application Nos. 10-2022-0003332, filed on Jan. 10, 2022, and 10-2022-0097600, filed on Aug. 4, 2022, in the Korean Intellectual Property Office, the disclosures all of which are hereby incorporated by reference herein in their entireties.

BACKGROUND

1. Field

Various embodiments of the disclosure relate to a driving device providing motor driving for managing clothing, and a clothing treatment device including the same.

2. Description of Related Art

The clothing treatment device may be a device that performs various clothing management tasks, such as washing, drying, deodorizing, or dewrinkling. The clothing treatment device may be, e.g., a washer or a dryer. Among clothing treatment devices, the washer is a machine that washes laundry, such as clothes, by electricity and may perform washing, rinsing, draining, or spinning according to the user's operation input. In general, the washer may include a tub containing a certain amount of water and a drum rotatably installed inside the tub. The washer may perform washing, rinsing, draining or spinning cycles by rotating the drum inside the tub by a driving device.

As described above, in the clothing treatment device providing operations according to various cycles, the drum rotated by the driving device may generate vibration of the tub. The vibration of the tub may touch the back cover to cause noise or nicks. Therefore, the tub needs to maintain a certain distance from the back cover considering noise or nicks in the back cover. For example, given the possibility of noise or nicks in the back cover, the driving device which is provided under the tub to transfer rotational force to the drum needs to remain a predetermined distance apart from the back cover. Therefore, a need exists for a method for reducing the thickness of the driving device as much as possible to secure a spacing from the back cover considering the limited internal space of the clothing treatment device.

SUMMARY

Aspects of embodiments of the disclosure will be set forth in part in the description which follows and, in part, will be apparent from the description, or may be learned by practice of the presented embodiments.

According to an embodiment of the disclosure, a driving device may include a stator; a rotor including a rotor frame and provided to be rotatable about a rotational axis of a clothing treatment device through interaction with the stator; and a clutch including a movable member configured to slide along the rotational axis to be selectively coupled to the rotor according to an operation mode of the clothing treatment device. The rotor frame may include a plurality of holes, and a plurality of coupling protrusions protruding toward the clutch so as to be coupled with the movable member when the movable member is slid to be coupled to the rotor. The plurality of coupling protrusions may be integrally formed with the rotor frame and punched out of the rotor frame to form the plurality of holes.

According to an embodiment of the disclosure, the plurality of coupling protrusions are formed in a vertical direction relative to the plurality of holes, and a side of each coupling protrusion of the plurality of coupling protrusions contacts a side of a hole of the plurality of holes which the coupling protrusion was punched out to form.

According to an embodiment of the disclosure, the plurality of coupling protrusions are arranged to be spaced apart at a predetermined interval along a circumference having a predetermined radius around a central axis of the rotor frame.

According to an embodiment of the disclosure, the plurality of holes are formed along a circumference having a predetermined radius from a central axis of the rotor frame, the plurality of coupling protrusions are formed in a vertical direction relative to the plurality of holes, and a side of each coupling protrusion of the plurality of coupling protrusions contacts an outer side of a hole of the plurality of holes which the coupling protrusion was punched out to form.

According to an embodiment of the disclosure, the plurality of coupling protrusions are formed so as to be spaced apart at a predetermined interval along a circumference having a predetermined radius from a central axis of the rotor frame, and arranged in pairs so that a side of each coupling protrusion of a pair of the coupling protrusions respectively contacts opposite sides of a hole of the plurality of holes which the pair of the coupling protrusions were punched out to form.

According to an embodiment of the disclosure, each pair of the pairs of the coupling protrusions includes a first coupling protrusion and a second coupling protrusion, and the movable member includes a plurality of locking recesses each formed with a first side surface and a second side surface to respectively contact the first coupling protrusion and the second coupling protrusion of one of the pairs of the coupling protrusions when the movable member is coupled to the rotor.

According to an embodiment of the disclosure, each pair of the pairs of the coupling protrusions includes a first coupling protrusion and a second coupling protrusion, and the movable member includes a plurality of locking recesses disposed so that each locking recess of the plurality of locking recesses is interposed between the first coupling protrusion and the second coupling protrusion of one of the pairs of the coupling protrusions when the movable member is coupled to the rotor.

According to an embodiment of the disclosure, driving device further includes a damper fitted into at least one hole of the plurality of holes.

According to an embodiment of the disclosure, the damper is disposed to perform a cushioning action between the plurality of coupling protrusions formed in the rotor frame, and the movable member provided in the clutch, when the clutch is coupled to the rotor.

According to an embodiment of the disclosure, during a spin-drying operation, the movable member is slid toward the rotor so that the clutch and the rotor are interlocked, and the plurality of coupling protrusions formed in the rotor frame are engaged with a plurality of locking recesses of the movable member.

According to an embodiment of the disclosure, a driving device may include a stator; a rotor provided to be rotatable about a rotational axis of a clothing treatment device through interaction with the stator; an insulator configured to surround at least a portion of the stator; and a clutch including a movable member configured to slide along the rotational axis to be selectively coupled to, and uncoupled from, the rotor according to an operation mode of the clothing treatment device. The insulator may include a coupling area to receive the clutch, and a connection member provided in the coupling area and configured to protrude toward the rotational axis so as to be engaged with the movable member when the movable member is slid to be uncoupled from the rotor.

According to an embodiment of the disclosure, the connection member includes a plurality of protrusions, and the plurality of protrusions are arranged to be spaced apart from each other in a circumferential direction surrounding the rotational axis.

According to an embodiment of the disclosure, the insulator is injection-molded to be integrally configured with the connection member.

According to an embodiment of the disclosure, the driving device further includes a fixing member protruding and extending from an upper surface of the insulator toward the clutch; and a fixing area disposed in the clutch and formed to be open to have the fixing member pass therethrough to fix a portion of the clutch to the insulator.

According to an embodiment of the disclosure, the movable member includes a locking recess, and during a washing operation, the movable member is slid toward the insulator, and the connection member is engaged with the locking recess of the movable member.

According to an embodiment of the disclosure, a driving device may include a stator; a rotor including a rotor frame and provided to be rotatable about a rotational axis of a clothing treatment device through interaction with the stator; an insulator configured to surround at least a portion of the stator; and a clutch including a movable member configured to slide along the rotational axis to be selectively coupled to, and uncoupled from, the rotor according to an operation mode of the clothing treatment device. The rotor frame may include a plurality of holes, and a plurality of coupling protrusions protruding toward the clutch so as to be coupled with the movable member when the movable member is slid to be coupled to the rotor. The plurality of coupling protrusions are integrally formed with the rotor frame and punched out of the rotor frame to form the plurality of holes. The insulator may includes a coupling area open inwardly from an upper surface to receive the clutch, and a connection member provided in the coupling area and configured to protrude toward the rotational axis so as to be engaged with the movable member when the movable member is slid to be uncoupled from the rotor.

According to an embodiment of the disclosure, the plurality of coupling protrusions are formed in a vertical direction relative to the plurality of holes, and a side of each coupling protrusion of the plurality of coupling protrusions contacts a side of a hole of the plurality of holes which the coupling protrusion was punched out to form.

According to an embodiment of the disclosure, the plurality of coupling protrusions are formed so as to be spaced apart at a predetermined interval along a circumference having a predetermined radius from a central axis of the rotor frame, and arranged in pairs so that a side of each coupling protrusion of a pair of the coupling protrusions respectively contacts opposite sides of a hole of the plurality of holes which the pair of the coupling protrusions were punched out to form.

According to an embodiment of the disclosure, an area surrounding the stator and extending to the coupling area including the connection member is injection-molded so as to be integrally configured.

According to an embodiment of the disclosure, the driving device further includes a fixing member protruding and extending from an upper surface of the insulator toward the clutch; and a fixing area disposed in the clutch and formed to be open to have the fixing member pass therethrough to fix a portion of the clutch to the insulator.

The technical objects of the disclosure are not limited to the foregoing, and other technical objects may be derived by one of ordinary skill in the art from example embodiments of the disclosure.

Effects of the present invention are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
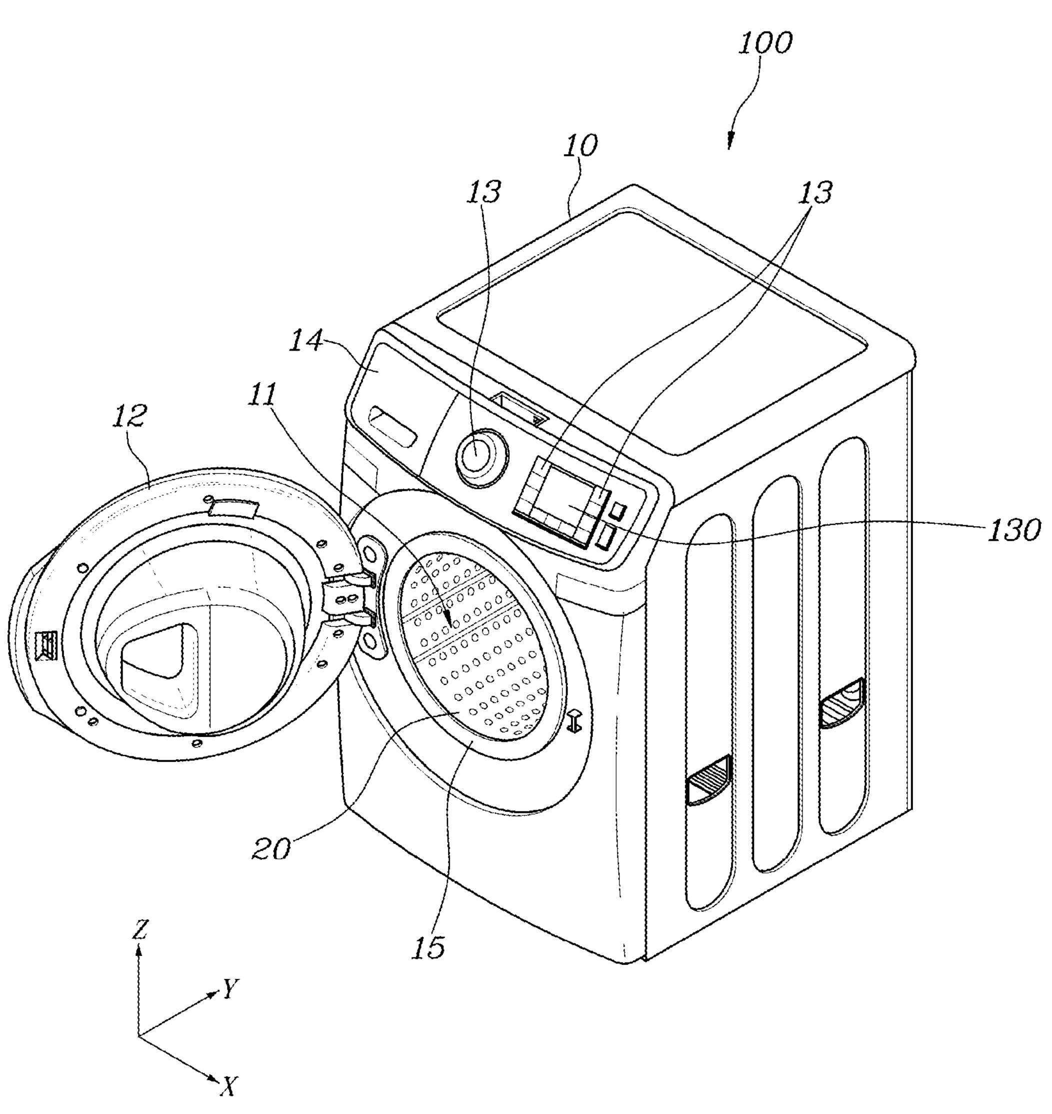
FIG. 1 is a perspective view illustrating a clothing treatment device according to an embodiment of the disclosure.

Hereinafter, with reference to the drawings, various embodiments of the present disclosure will be described in detail so that those having ordinary knowledge in the technical field to which the present disclosure pertains can easily implement the disclosed invention. However, the present disclosure may be implemented in several different forms and is not limited to the embodiments described herein. In connection with the description of the drawings, like or similar reference numerals may be used for like or similar components. Further, in the drawings and their related descriptions, descriptions of well-known functions and configurations may be omitted for clarity and conciseness.

FIG. 1 is a perspective view illustrating a clothing treatment device 100 according to an embodiment of the disclosure.

Referring to FIG. 1, a clothing treatment device 100 according to an embodiment may include a main body 10.

In an embodiment, the clothing treatment device 100 may be a device for managing or cleaning clothes. The clothing treatment device 100 may be, e.g., a washer, dryer, or clothing care device. Hereinafter, for convenience of description, a washer is described as an example of the clothing treatment device 100 but, without limitations thereto in actual implementation, embodiments of the disclosure may be implemented as various types of clothing treatment device 100.

In an embodiment, the clothing treatment device 100 may mean a device for washing laundry or spin-drying wet laundry using water and detergent. According to an embodiment, the clothing treatment device 100 may dry the laundry for which spin-drying has been completed.

In an embodiment, the clothing treatment device 100 may be classified as a top-loading type in which an inlet 11 is mainly provided in the top of the main body 10 and the rotational axis of the tub 15 is perpendicular to the ground, a front-loading type in which an inlet 11 is provided in the front of the main body 10 and the rotational axis of the tub 15 is horizontal to the ground, or a hybrid type which is a combination thereof. The top-loading type washer may also be called a 'normal washer' or a 'top loader washer,' and the front-loading type washer may also be called a 'drum washer.' FIG. 1 illustrates a front-loading type washer, but the clothing treatment device according to various embodiments is not limited thereto.

According to an embodiment, the main body 10 may form the outer appearance of the clothing treatment device 100. A laundry inlet 11 may be formed in the front surface of the main body 10 to put in or pull out laundry. A door 12 may be installed at the laundry inlet 11 to be opened/closed. Laundry may be received through the laundry inlet 11 of the clothing treatment device 100 into the drum 20 of the tub 15 disposed therein.

According to an embodiment, an input device 13, such as a plurality of buttons and a rotation lever for the user's control, may be provided on the front surface of the main body 10. The input device 13 may include an input module (e.g., the input interface 170 of FIG. 3) to receive commands from the user to control the clothing treatment device 100. A display 130 may be provided on the front surface of the main body 10 to display information related to the clothing treatment device 100 and washing.

In an embodiment, a detergent receiving unit 14 may supply detergent or fabric softener to the tub 15. The detergent receiving unit 14 may deliver the detergent to the drum 20 in the process of supplying washing water. For example, if a water supply valve (e.g., the water supply valve 113 of FIG. 2) is opened to supply water to the water supply pipe (e.g., the water supply pipe 30 of FIG. 2), the water is provided to the detergent receiving unit 14 to be mixed with the detergent or fabric softener received in the detergent receiving unit 14. Accordingly, the water mixed with the detergent or fabric softener may be supplied to the tub 15.

Figure 2:
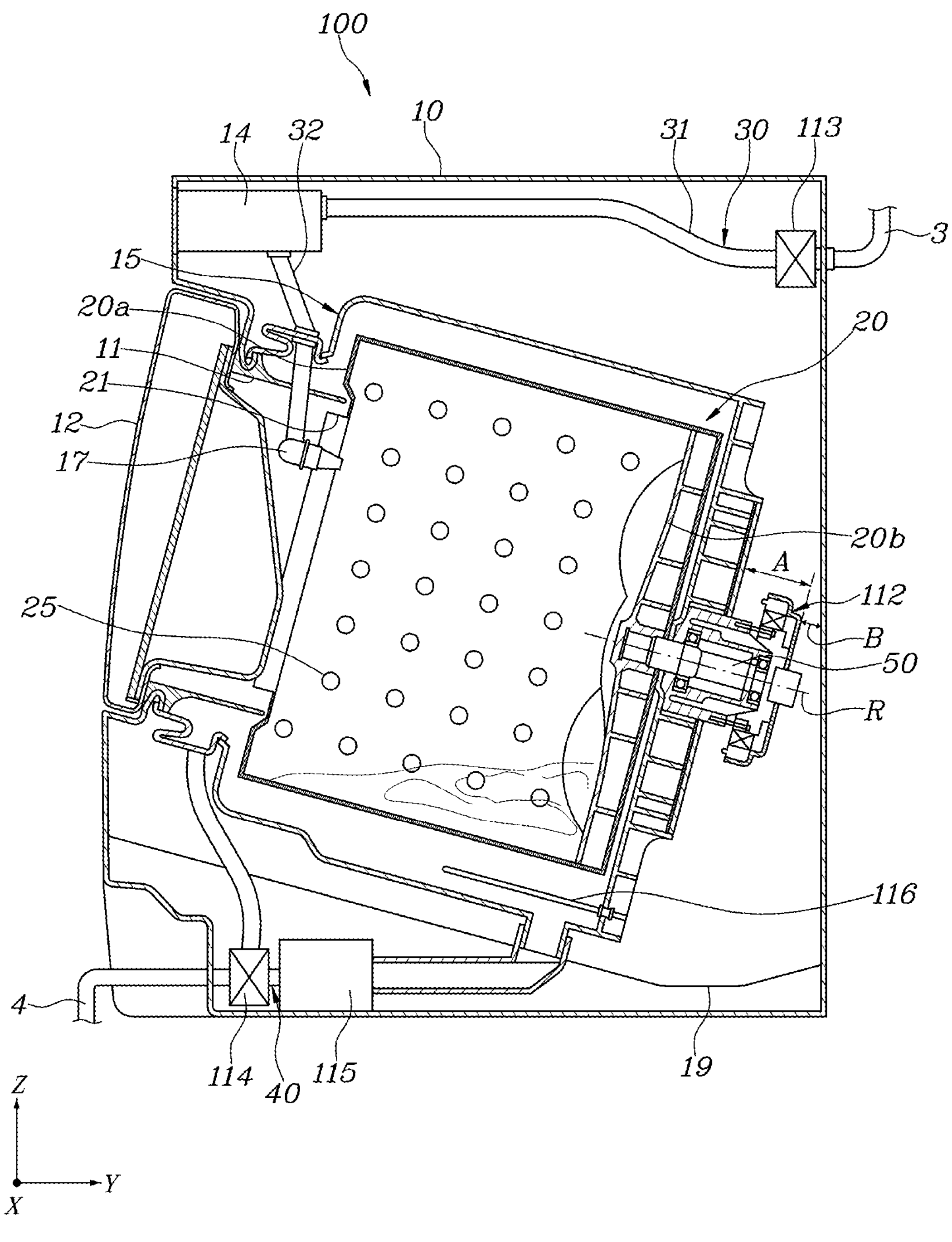
FIG. 2 is a cross-sectional view illustrating a clothing treatment device according to an embodiment of the disclosure.

FIG. 2 is a cross-sectional view illustrating a clothing treatment device 100 according to an embodiment of the disclosure.

Referring to FIG. 2, the clothing treatment device 100 may include at least some of a tub 15, a drum 20, a water supply pipe 30, or a drain pipe 40.

In an embodiment, the tub 15 may be provided inside the main body 10 of the clothing treatment device 100. The tub 15 may be formed in a cylindrical shape with an opening toward the laundry inlet 11. The tub 15 may store a predetermined amount of water necessary for washing. A water reservoir 19 may be provided in a lower end of the main body to store the washing water from the tub 15 without leaking to the outside.

In an embodiment, the tub 15 may be installed at a predetermined angle from the installation surface (e.g., horizontal surface) of the clothing treatment device 100, inside the main body 10, so that the front portion of the tub 15 is positioned higher than the rear portion of the tub 15.

Specifically, the drum 20 may be installed so that the front portion 20*a* is in a higher position than the rear portion 20*b*, i.e., at a preset angle (e.g., 5 degrees, 15 degrees, or 30 degrees) from the horizontal surface. This is merely an example, and the drum 20 may also be installed at an angle (e.g., 0 degrees) at which the front portion 20*a* and the rear portion 20*b* are not inclined.

In an embodiment, the drum 20 may be installed inside the tub 15 at the same angle as the water tank. The front portion of the drum 20 may be a surface with an opening formed in the same direction as the inlet 11 of the main body 10 to allow insertion of laundry. The rear portion of the drum 20 may be a surface opposite to the front portion. When the tub 15 is disposed not to be inclined, the rotational axis of the drum 20 may be provided in a direction horizontal to the ground.

In an embodiment, the drum 20 may be installed inside the tub 15. The drum 20 may be implemented substantially in a cylindrical shape and form a space for receiving and washing the inserted laundry. An opening corresponding to the laundry inlet 11 may be provided in the front surface of the drum 20. The laundry may be put into the drum 20 through the laundry inlet 11.

In an embodiment, the drum 20 may have a plurality of through holes 25. The washing water in the drum 20 may be drained to an external drain pipe 4 through the plurality of through holes 25. For example, the washing water supplied from the external water supply pipe 3 during the water supply cycle of the clothing treatment device 100 may be supplied to the inside of the tub 15 through a nozzle connected with the water supply pipe 30. During the spin-drying cycle of the clothing treatment device 100, the drum 20 may be spun at high speed by a motor assembly (e.g., the motor assembly 112*a* of FIG. 3) of the driving device 112. By the centrifugal force of rotation of the drum 20, the washing water inside the drum 20 may flow out of the drum 20 through the plurality of through holes 25 formed in the drum 20. The washing water received in the space between the outer wall of the drum 20 and the inner wall of the tub 15 may be drained to the external drain pipe 4 along the drain pipe 40.

In an embodiment, the drum 20 may be connected to a shaft 50. The drum 20 may be rotated about the rotational axis (R). The rotational RPM of the drum 20 may vary depending on the purpose of the clothing treatment device 100, the ongoing cycle, and the performance of the motor assembly 112*a* of the driving device 112. For example, the drum 20 may be rotated 1000 to 3000 times per minute.

In an embodiment, the driving device 112 or the shaft 50 for rotating the drum 20 may be installed on the rear portion of the tub 15. The tub 15 may further include a suspension device (not shown) for damping vibration generated when the drum 20 is rotated. If the drum 20 is rotated by the motor assembly 112*a*, dirt from the laundry put in the drum 20 may be removed from the laundry while rubbing against the water stored in the tub 15.

In an embodiment, a first width A may be a substantial distance from the rear surface of the tub 15 to the rear surface of the driving device 112. A second width B may be a substantial distance from the rear surface of the driving device 112 to the rear surface of the main body 10. In an embodiment, when the driving device 112 is driven, vibration may be transferred to the tub 15 on which the driving device 112 is installed. In this case, the driving device 112 and the tub 15 may vibrate in a plurality of directions. In an embodiment, when the second width B is short, vibration of the driving device 112 and the tub 15 causes the driving device 112 and the main body 10 to contact and impact each other. In this case, at least a portion of the driving device 112 and the main body 10 may be damaged.

For example, when the driving device 112 includes a clutch module (e.g., the clutch 112*b* of FIG. 3) or a reduction gear 112*c* coupled to the motor assembly 112*a*, the first width A may increase, and the second width B may decrease inside the same main body.

The driving device 112 and the clothing treatment device 100 including the same, according to an embodiment of the disclosure, disclose a structure for thinning the driving device 112 to secure the second width B. This is described below in greater detail with reference to FIG. 4A or its subsequent figures.

In an embodiment, a spray nozzle 17 may be formed in an inlet area 21 of the tub 15. The spray nozzle 17 may be connected to the water supply pipe 30 to supply washing water to the inside of the drum 20. A drain pipe 40 for draining washing water may be connected to one lower side of the tub 15. Washing water may refer to general water. However, the washing water may be a mixture that further includes detergent or contaminants in addition to water.

In an embodiment, the rear portion 20*b* of the drum 20 may be coupled to the shaft 50 of the driver 110 installed on the rear part of the tub 15. The drum 20 may receive the power (e.g., rotational force) generated from the motor assembly 112*a* of the driver 110 through the shaft 50 and rotate along the axial direction of the rotational axis R.

In an embodiment, the clothing treatment device 100 may include a water supply pipe 30 for supplying water to the tub 15 and the drum 20. The water supply pipe 30 may be connected to the external water supply pipe 3 of the faucet. The clothing treatment device 100 may include a water supply valve 113 that opens and closes the water supply pipe 30. The water supply pipe 30 connects the external water supply pipe 3 and the tub 15 or drum 20 to serve as a flow path for supplying washing water from the external water supply pipe 3 to the tub 15 or drum 20. A pair of water supply pipes 30 may be formed to supply cold water and hot water.

In an embodiment, the detergent receiving unit 14 may supply detergent to the drum 20. By means of the water supply pipe 30, the detergent may be transferred to the drum 20. For example, the water supply pipe 30 may supply the detergent contained in the detergent receiving unit 14, along with the washing water supplied from the external water supply pipe 3 and passed through the detergent receiving unit 14, to the inside of the drum 20. The detergent receiving unit 14 may include a detergent supply valve (e.g., the detergent supply valve 118 of FIG. 3) to open/close the detergent receiving unit 14 and a second water supply pipe 32 to connect the detergent receiving unit 14 and the drum 20 to control the detergent supplied to the inside of the drum 20.

In an embodiment, the drain pipe 40 may connect the tub 15 and the external drain pipe 4 to serve as a flow path for draining the washing water contained in the drum 20 to the external drain pipe 4. The drain pipe 40 may be connected to a pump 115 for flowing washing water in the drum and a drain valve 114 to open/close to drain or maintain washing water in the drum 20. The processor 140 may control the pump 115 or the drain valve 114 to drain the washing water from the drum 20 to the outside or to circulate the washing water back to the drum. When the drain valve 114 is closed and the pump 115 is driven to control to circulate the washing water, the fluidity of the washing water in the drum 20 is increased, and the washing water is evenly transferred to the laundry, enhancing the washing performance.

In an embodiment, the driver 110 may drive the overall operation of the clothing treatment device 100. The driver 110 may rotate the drum 20 or a pulsator (not shown). The driver 110 may drive a heat exchanger 190 or a heater 116. The clothing treatment device 100 may receive an input signal from the user and perform a plurality of unit cycles of the clothing treatment device 100 through the driver 110. The plurality of unit cycles may include water supply, washing, rinsing, spin-drying, or draining.

Figure 3:
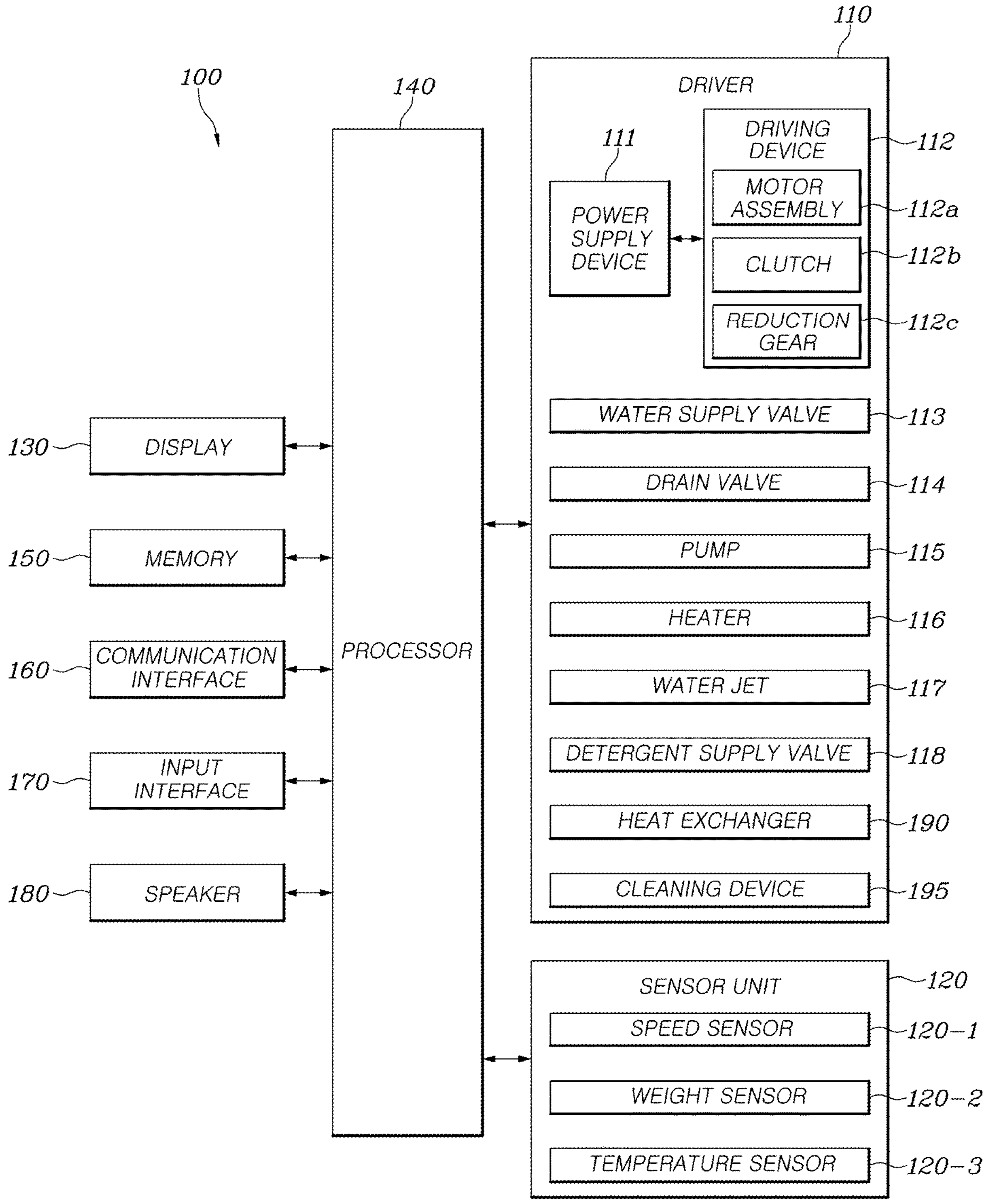
FIG. 3 is a block diagram illustrating a configuration of a clothing treatment device according to an embodiment of the disclosure.

FIG. 3 is a block diagram illustrating a configuration of a clothing treatment device 100 according to an embodiment of the disclosure.

Referring to FIG. 3, the clothing treatment device 100 may include at least some of a driver 110, a sensor unit 120, and a processor 140.

In an embodiment, the driver 110 is a component for performing the overall mechanical operation of the clothing treatment device 100 and may perform operations under the control of the processor 140. The driver 110 may include a power supply device 111 or a driving device 112 to rotate the drum (e.g., the drum 20 of FIG. 2) of the clothing treatment device 100.

In an embodiment, the power supply device 111 may provide power to the driving device 112 and control the rotation speed and/or torque of the driving device 112. The power supply device 111 may control driving of the driving device 112 according to a control signal of the processor 140. For example, the power supply device 111 may control the speed of the motor assembly 112*a* of the driving device 112 by a voltage control scheme or a frequency conversion scheme.

In an embodiment, the power supply device 111 may be controlled by an Intelligent power module (IPM) configured as a switching device. The intelligent power module may be a power module having a protection function for protecting the power device or driving circuit. For example, in the power supply device 111 controlling the motor assembly 112*a*, damage to components of the power supply device 111 and the clothing treatment device 100 due to overheating caused by an increase in load may be prevented.

In an embodiment, the driving device 112 may rotate the drum 20. The driving device 112 may refer to a prime movable member that converts externally applied energy (e.g., electric power) into power energy. In an embodiment, the driving device 112 may include at least some of a motor assembly 112*a*, a clutch 112*b*, and a reduction gear 112*c*.

In an embodiment, the motor assembly 112*a* may transfer power energy to a shaft (e.g., the shaft 50 of FIG. 2) positioned on the rotational axis (e.g., the rotational axis R of FIG. 2). The shaft 50 may be coupled to the motor assembly 112*a* or the drum 20 to transfer the power transferred from the driving device 112 to the drum 20, thereby rotating the drum 20.

In an embodiment, the clutch 112*b* may change the connection state of the reduction gear 112*c* or the motor assembly 112*a*. The reduction gear 112*c* may include a plurality of rotatable gears connected to the motor assembly 112*a*. The reduction gear 112*c* may receive power from the motor assembly 112*a*. The clutch 112*b* and the reduction gear 112*c* may change the rotational state, e.g., rotation speed or rotation torque, of the shaft 50 in the motor assembly 112*a* including a single shaft 50. The structure of the driving device 112 according to an embodiment of the disclosure is described below with reference to the drawings in FIG. 4A.

In an embodiment, the driver 110 may include at least some of a water supply valve 113, a drain valve 114, a pump 115, a water jet 117, or a detergent supply valve 118.

In an embodiment, the water supply valve 113 may be opened and closed to supply or shut off washing water into the drum 20 under the control of the processor 140. The water supply valve 113 may be implemented as a solenoid valve or an electromagnetic valve that may be opened and closed by movement of a coil according to an applied current.

In an embodiment, the water supply valve 113 may be installed between an external water supply pipe (e.g., the external water supply pipe 3 of FIG. 2) and a water supply pipe (e.g., the water supply pipe 30 of FIG. 2) of the clothing treatment device 100. The water supply pipe 30 of the clothing treatment device 100 may connect the external water supply pipe 3 or the drum 20. When the water supply valve 113 is in an on state, washing water may be supplied to the inside of the drum 20 along the water supply pipe 30. In other words, the water supply valve 113 may control to supply or shut off washing water from the external water supply pipe 3 to the inside of the drum 20 according to the state (on or off) of the water supply valve 113.

For example, the water supply pipe 30 may include a first water supply pipe 31 connecting between the external water supply pipe 3 or the detergent receiving unit 14 and a second water supply pipe 32 connecting the detergent receiving unit (e.g., the detergent receiving unit 14 of FIG. 2) or the drum 20. The washing water supplied from the external water supply pipe 3 passes through the detergent supply valve 118 or the detergent receiving unit 14, so that the washing water and detergent contained in the detergent receiving unit 14 may be supplied to the inside of the drum 20.

In an embodiment, the drain valve 114 may be opened and closed so that the washing water filling the drum 20 is drained or maintained under the control of the processor 140. The drain valve 114 may be implemented as a solenoid valve or an electromagnetic valve that may be opened and closed by movement of a coil according to an applied current.

In an embodiment, the drain valve 114 may be installed between a drain pipe (e.g., the drain pipe 40 of FIG. 2) and an external drain pipe (e.g., the external drain pipe 4 of FIG. 2) of the clothing treatment device 100. The drain pipe 40 of the clothing treatment device 100 may connect the drum 20 or the external drain pipe 4. When the drain valve 114 is in an on state, the washing water filling the drum 20 may be drained to the external drain pipe 4 along the drain pipe 40. In other words, the drain valve 114 may control to drain washing water from the inside of the drum 20 to the external drain pipe 4 or maintain the washing water according to the state (on or off) of the drain valve 114.

In an embodiment, the pump 115 may discharge washing water filling the drum 20 to the external drain pipe 4 by power or pressure under the control of the processor 140. To this end, the pump 115 may be installed between the drain pipe 40 and the external drain pipe 4.

In an embodiment, the pump 115 may include a shaft (not shown) having an impeller (not shown), an electric motor (not shown) mechanically connected to the shaft, a suction pipe (not shown) connected to the drain pipe 40, or a discharge pipe connected to the drain pipe 4. If the impeller is rotated by the electric motor of the pump 115 when the drain valve 114 is in the on state, the washing water in the drum 20 may be forcibly discharged to the external drain pipe 4 through the suction pipe and the discharge pipe. The processor 140 may circulate the washing water in the drum 20 by driving the pump 115 while the drain valve 114 is in the off state.

In an embodiment, the heater 116 may heat washing water filling the drum 20 to boil laundry or wash the drum 20. In an embodiment, if power is applied under the control of the processor 140, the heater 116 may convert applied electrical energy into thermal energy to heat the washing water in the drum 20.

In an embodiment, the water jet 117 may include a water jet pump (not shown) or a nozzle (not shown). The water jet 117 may jet the introduced washing water at high pressure through a nozzle by means of a water jet pump (not shown). The water jet 117 may jet washing water to a specific location inside the drum 20 to remove contaminants remaining inside the drum 20. In this case, the water jet 117 may be implemented as a device separate from the spray nozzle 17 for supplying washing water to the inside of the drum 20, or the water jet 117 and the spray nozzle 17 may be integrated into a single device.

In an embodiment, the detergent supply valve 118 may open and close the detergent receiving unit 14, and may automatically control the detergent supplied into the drum 20. The clothing treatment device 100 may include a detergent supply device (not shown) including a detergent supply valve 118, a detergent receiving unit 14 or a detergent sensor (not shown). The detergent supply device (not shown) may receive and store a certain amount of detergent. When the clothing treatment device 100 is driven, the detergent supply device may calculate the amount of detergent required by the processor 140 and open the detergent supply valve 118 to automatically provide a certain amount of detergent to the drum 20. This eliminates the need for the user to measure detergent whenever driving the clothing treatment device 100 and allows the user to supply an appropriate amount of detergent conveniently by the supply device (not shown).

In an embodiment, the heat exchanger 190 may condense or expand the refrigerant, dry or heat the air passing through the heat exchanger 190, and provide hot dried gas to the drum 20.

In an embodiment, a cleaning device 195 may clean the internal components, e.g., the filter, nozzle, or heat exchanger 190, of the clothing treatment device 100. The cleaning device 195 may prevent performance degradation or worn-out of internal components due to long-term use of the clothing treatment device 100.

In an embodiment, the sensor unit 120 may detect the operation state of the clothing treatment device 100 or the ambient environment. The sensor unit 120 may generate and output an electrical signal for the detection result. The sensor unit 120 may transfer electrical signals to the processor 140 or store detection results in the memory 150 of the clothing treatment device 100 or in an external device.

For example, the sensor unit 120 may generate an electrical signal or obtain data by detecting the operation state of the clothing treatment device 100 or the ambient environment while a washing course is being performed. The processor 140 may obtain diagnostic information by processing the signals or data received from the sensor unit 120.

In an embodiment, the sensors included in the sensor unit 120 may be implemented as physically separated devices or may be implemented as a single device. In other words, the sensor unit 120 is not limited to being implemented as a single physical device. The sensor unit 120 may transfer the detection value to the processor 140. The processor 140 may control the operation of the clothing treatment device 100 based on the received detection value. The processor 140 may store the detection value as diagnostic information in the memory 150 or transmit it to an external device (e.g., server or smart phone) through the communication interface 160.

In an embodiment, the sensor unit 120 may include at least some of a speed sensor 120-1, a weight sensor 120-2, or a temperature sensor 120-3.

In an embodiment, the speed sensor 120-1 may detect the rotation speed, rotation angle, and rotation direction of the motor assembly **112*a* or the drum 20. The processor 140 may calculate the rotation speed, rotation angle, or rotation direction of the motor assembly 112*a* or the drum 20 detected by the speed sensor 120-1. The processor 140 may control the operation of the clothing treatment device 100 based on the calculated rotation speed, rotation angle, or rotation direction of the motor assembly 112*a* or the drum 20**.

In an embodiment, in a case where the driving device 112 rotates the drum 20, the speed sensor 120-1 may be implemented as a sensor of a type detecting the load applied to the motor assembly **112*a*, a type detecting the on/off signal of the hall sensor adjacent to the rotator while the motor assembly 112*a* rotates, or a type measuring the magnitude of the current applied to the motor assembly 112*a* or the driver 110 while the drum 20** rotates.

In an embodiment, the weight sensor 120-2 may detect the weight of the drum 20. When laundry is present inside the drum 20, the weight sensor 120-2 may detect the weight of the laundry or the drum 20. The weight sensor 120-2 may detect the weight of the laundry stored in the drum 20 in such a manner as to estimate the difference between the detected weight and the stored weight of the drum 20 as the weight of the laundry.

In an embodiment, the weight sensor 120-2 may obtain diagnostic information by detecting the weight of the drum 20 by rotating the drum 20 in which no laundry is present. To this end, the weight sensor 120-2 may estimate the moment of inertia from the rotation speed and rotation angle of the motor assembly **112*a* or the drum 20 detected through the speed sensor 120-1. The weight sensor 120-2 may detect the weight of the drum 20** in such a manner as to estimate the weight corresponding to the moment of inertia.

In an embodiment, in the weight sensor 120-2, if the weight of the drum 20 is applied to the load cell, the form of the load cell may be changed. The weight sensor 120-2 may be implemented with various sensors, such as ones of detecting the magnitude of the voltage according to the changed form and estimating the weight of the drum 20 corresponding to the magnitude of the voltage.

In an embodiment, the temperature sensor 120-3 may be an external temperature sensor that detects the temperature of the ambient environment of the clothing treatment device 100 or an internal temperature sensor that detects the temperature of the inside of the clothing treatment device 100, such as the temperature of the washing water in the tub 15, the temperature of the heater 116, or the temperature of the power supply device 111.

In an embodiment, the temperature sensor 120-3 may be implemented as a thermistor, which is a type of resistor using a property in which resistance of a material changes according to temperature. In this case, the thermistor may have a negative temperature coefficient (NTC) characteristic in which resistance decreases as temperature increases, and increases as the temperature decreases.

In an embodiment, the temperature sensor 120-3 may be a temperature sensor for detecting the temperature of the heater 116 or washing water. The temperature sensor 120-3 may further include a temperature control device (e.g., thermostat). The temperature control device may detect the amount of heat generated from, e.g., the heat exchanger 190 and control to maintain the temperature of the washing water or the drum 20 at a specific temperature due to the heat generated from the heater 116.

In an embodiment, the sensor unit 120 is not limited to the above-described configuration but may further include at least one of a water level sensor that detects the level or flow rate of washing water, a detergent sensor that detects the type or remaining amount of detergent, a leak sensor that detects leakage of washing water, a humidity sensor that detects humidity in the air, a turbidity sensor that detects the turbidity of washing water, a door sensor that detects whether the door 12 is opened or closed, a vibration sensor that detects how much the clothing treatment device 100 vibrates, or a valve sensor that detects the operation of the water supply valve 113 or drain valve 114.

In an embodiment, the sensor unit 120 may detect the weight of the drum 20, abnormality of the water supply valve 113 for supplying washing water, the temperature of the washing water, the flow rate of the washing water supplied to the drum 20, abnormality of the motor assembly 112*a*, abnormality of the drain valve 114 for draining washing water, flow rate of washing water drained from the drum 20, or vibration of the clothing treatment device 100. The sensor unit 120 may help enhance the washing cycle and washing performance of the clothing treatment device 100. The sensor unit 120 may detect abnormality of the clothing treatment device 100.

In an embodiment, the display 130 may display the diagnostic information obtained through the sensor unit 120 in the display area under the control of the processor 140. The display 130 may be disposed on the front surface of the housing of the clothing treatment device 100. The user may identify the driving status of the clothing treatment device 100 through the display 130. The display 130 may be implemented in an external form rather than being built inside the clothing treatment device 100. Image data related to the clothing treatment device 100 may be displayed on, e.g., an external display wiredly or wirelessly connected to the clothing treatment device 100.

In an embodiment, the processor 140 may control the overall operation of the clothing treatment device 100. To this end, the processor 140 may include at least some of RAM, ROM, a graphics processing unit, a main CPU, first to n interfaces, or a bus.

In an embodiment, upon receiving a user command, the processor 140 may operate the driver 110 based on the input signal, stepwise performing the washing cycle. While the clothing treatment device 100 is running, the processor 140 may detect the driving state of the clothing treatment device 100 through the sensor unit 120. Based on this, the processor 140 may provide feedback on driving of the clothing treatment device 100 or obtain diagnostic information. The processor 140 may display the obtained diagnostic information on the display 130.

In an embodiment, the memory 150 may store various instructions, programs, or data necessary for the operation of the clothing treatment device 100 or the processor 140. The memory 150 may store the information obtained by the sensor unit 120 or data received from an external electronic device.

In an embodiment, the memory 150 may be accessed by the processor 140. The memory 150 may read/write/modify/delete/update data by the processor 140. In describing the disclosure, the term 'memory' may encompass the memory 150, RAM in the processor 140, ROM, or a memory card mounted in the clothing treatment device 100.

In an embodiment, the memory 150 may be implemented as a volatile memory, such as static random access memory (S-RAM) and dynamic random access memory (D-RAM), a non-volatile memory, such as flash memory, read only memory (ROM), and erasable programmable read only memory (EPROM), or electrically erasable programmable read only memory (EEPROM), hard disk drive (HDD) or solid state drive (SSD).

In an embodiment, the processor 140 or the memory 150 may be implemented as physically separate components, or may be implemented as a single component in which the processor 140 includes the memory 150. The processor 140 may have a single component or have a plurality of components implemented into a single system. The memory 150 may have a single component or have a plurality of components implemented into a single system.

In an embodiment, the communication interface 160 may transmit and receive various types of data by performing communication with an external device (e.g., a server or a smartphone) according to various types of communication schemes. For example, the communication interface 160 may transmit the information obtained by the sensor unit 120 to a server (or smart phone) or receive control commands for driving the clothing treatment device 100 from a server (or smart phone).

In an embodiment, the communication interface 160 may include at least one of a Bluetooth chip, a Wi-Fi chip, a wireless communication chip or near-field communication (NFC) chip for performing wireless communication, or an Ethernet module or universal serial bus (USB) module for performing wired communication. In this case, an Ethernet module or USB module for performing wired communication may communicate with an external device through an input/output port.

In an embodiment, the input interface 170 may receive user commands of various schemes from the user. The input interface 170 may transfer the received user command to the processor 140. The input interface 170 may include an input device 13, such as a touch panel or keys, a plurality of control buttons or a rotary lever.

In an embodiment, the speaker 180 may be built in the clothing treatment device 100 and output, as sound, various notifications or voice messages, as well as various types of audio data that have undergone various processing tasks, such as decoding, amplification, or noise filtering by an audio processor (not shown).

Hereinafter, a washing course of the clothing treatment device 100 is briefly described in relation to the structure of the clothing treatment device 100 or the operation of the processor 140.

In an embodiment, upon receiving a user command for managing the clothing treatment device 100, the processor 140 may supply washing water to the drum 20 as the water supply cycle. Specifically, the processor 140 may control the water supply valve 113 to open by switching the water supply valve 113 from the off state to on state. Accordingly, washing water may be supplied to the drum 20.

The processor 140 may adjust the amount of washing water supplied to the drum 20 by adjusting the time during which water supply valve 113 remains in the on state. The amount of washing water supplied in the washing course may be determined based on the capacity of the drum 20. For example, the amount of washing water supplied in the washing course may be determined as a maximum amount that the drum 20 may receive or an amount according to a predetermined ratio. The processor 140 may adjust the temperature of the washing water supplied to the drum 20 by adjusting the time during which the water supply valve 113 remains in the on state for cold water or hot water. The processor 140 may drive the heater 116 to adjust the temperature of the washing water.

In an embodiment, when a predetermined amount of washing water is supplied to the drum 20, the processor 140 may control to close the water supply valve 113 by switching the water supply valve 113 from the on state to off state. Accordingly, the supply of washing water may be stopped. If the supply of washing water is stopped and the water supply cycle is completed, the processor 140 may control the driver 110 to rotate the drum 20 filled with washing water as the washing cycle.

In an embodiment, the processor 140 may apply a control signal for rotating the drum 20 filled with washing water by the motor assembly 112*a* of the driving device 112 to the power supply device 111. The power supply device 111 may rotate the motor assembly 112*a* according to the applied control signal to transfer rotational force to the drum 20 to rotate the drum 20. The processor 140 may control the water jet 117 to spray high-temperature, high-pressure washing water to remove contaminants attached to the drum 20 or laundry. When the washing cycle is completed, the processor 140 may drain the washing water filling the drum 20 as the draining cycle. Specifically, the processor 140 may control the drain valve 114 to open by switching the drain valve 114 from the off state to on state. Accordingly, the washing water filling the drum 20 may be drained to the outside. The processor 140 may control the pump 115 to discharge the washing water filling the drum 20 to the external drain pipe 4 by power or pressure.

In an embodiment, the processor 140 may control the driver 110 to rotate the drum 20 as the spin-drying cycle. The power supply device 111 may drive the driving device 112 according to the applied control signal and transfer rotational force to the drum 20 to rotate the drum 20. For example, the control signal may be a signal for applying current to the motor assembly 112*a* or clutch 112*b* of the driving device 112 to stepwise drive the driving device 112. The control signal may be a signal for driving the driving device 112 at a decelerated, accelerated, or maintained rotation speed over time.

In the above-described embodiment, the draining cycle or spin-drying cycle is separately performed, but may be part of various cycles or may be simultaneously performed, or the draining cycle may be performed after the spin-drying cycle.

Figure 4A:
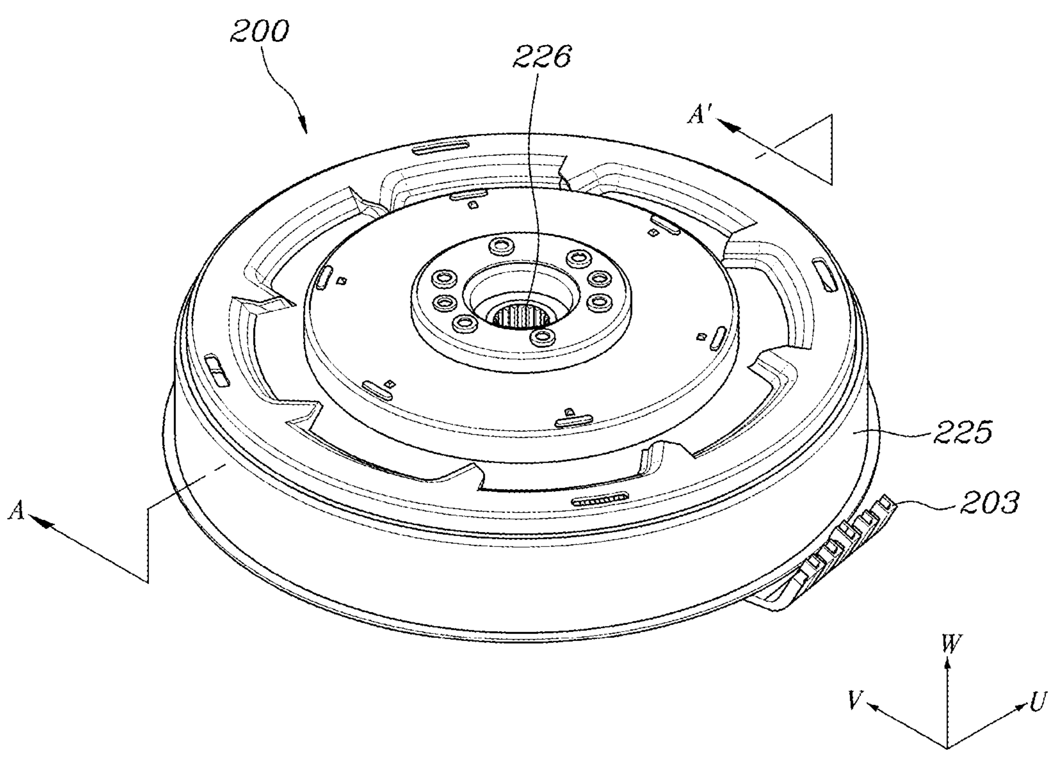
FIG. 4A is a perspective view illustrating a driving device according to an embodiment of the disclosure.
Figure 4B:
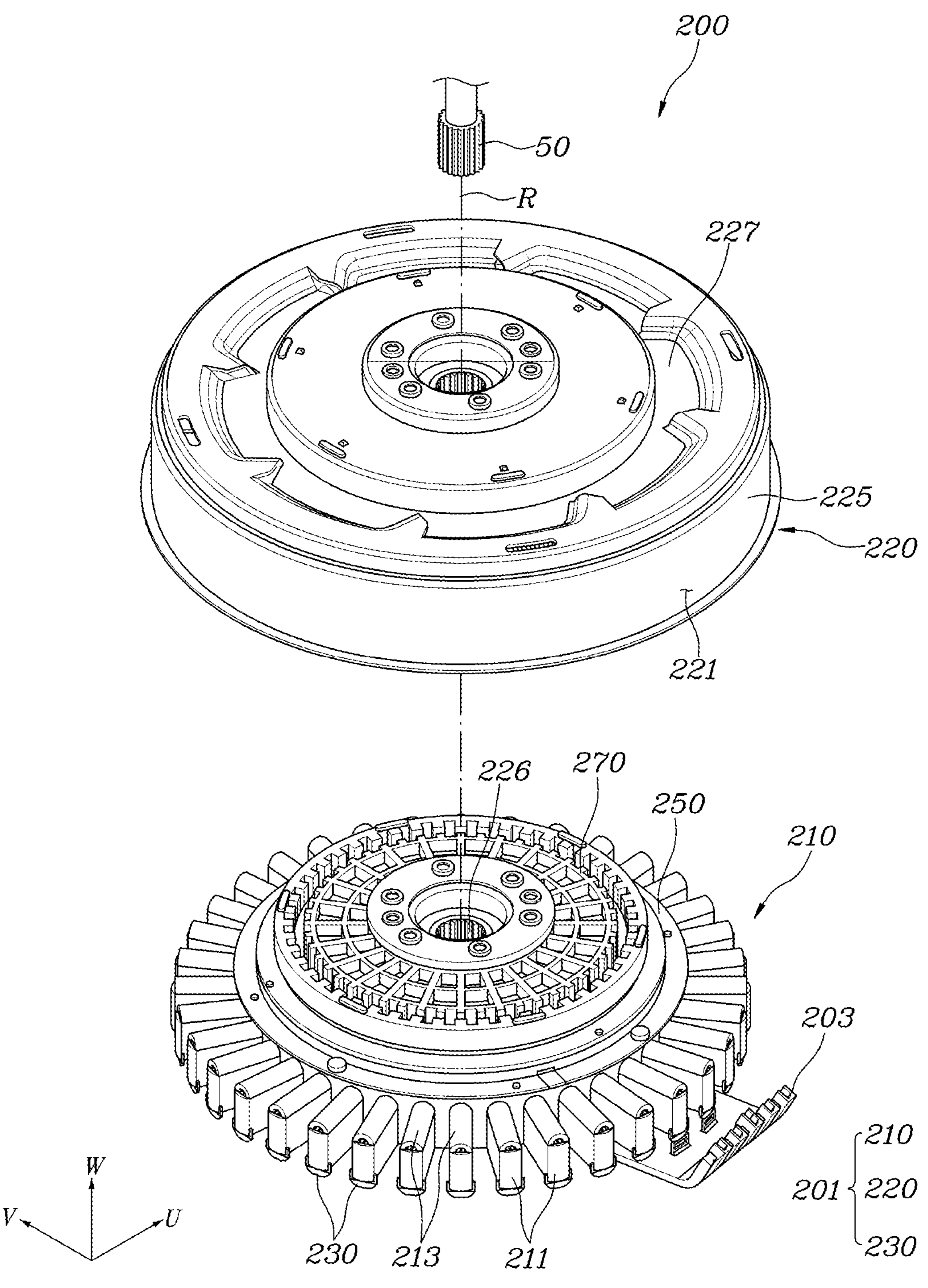
FIG. 4B is an exploded perspective view illustrating a driving device according to an embodiment of the disclosure.
Figure 4C:
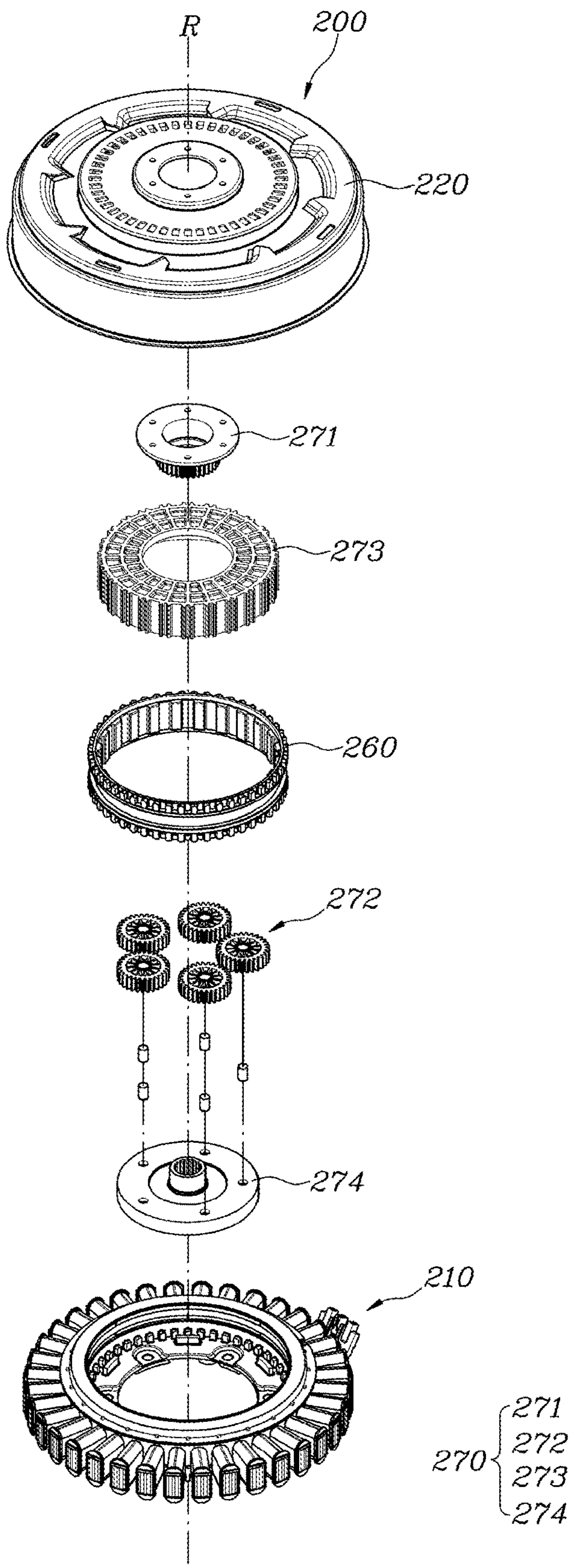
FIG. 4C is an exploded perspective view illustrating a driving device according to an embodiment of the disclosure.

FIG. 4A is a perspective view illustrating a driving device 200 according to an embodiment of the disclosure. FIG. 4B is an exploded perspective view illustrating a driving device 200 according to an embodiment of the disclosure. FIG. 4C is an exploded perspective view illustrating a driving device 200 according to an embodiment of the disclosure.

Referring to FIGS. 4A to 4C, in an embodiment, the driving device 200 applied to the clothing treatment device may provide a rotational force to allow the motor assembly 201 (e.g., the motor assembly 112*a* of FIG. 3) to operate at a low or high speed during the washing cycle. In an embodiment, to enhance the power efficiency of the motor assembly 201, the driving device 200 of the clothing treatment device may include an electronic clutch 250 (e.g., the clutch 112*b* of FIG. 3) and a reduction gear 270 (e.g., the reduction gear 112*c* of FIG. 3). In an embodiment, the driving device 200 may be formed not to include injection-molded articles for physically coupling the clutch 250 and the rotor frame 225 and be thus thinned.

According to an embodiment, the driving device 200 may include at least some of the motor assembly 201, the clutch 250 or the reduction gear 270.

In an embodiment, the driving device 200 may be provided so that the outside thereof is surrounded by the rotor frame 225. At least some of the stator 210 of the motor assembly 201, the rotor 220 of the motor assembly 201, the clutch 250 or the reduction gear 270 may be disposed inside the rotor frame 225. In an embodiment, the driving device 200 may include a serration 226 to which the shaft 50 is connected or a power supply unit 203 for supplying power.

In an embodiment, the serration 226 may connect the shaft 50 and the rotor 220 such that the shaft 50 rotates in conjunction with the rotor 220. The serration 226 may have a cross-sectional structure corresponding to the cross section of the shaft 50 so that the shaft 50 is fixed. For example, the serration 226 or the shaft 50 may have a structure that is bent in a circumferential direction surrounding the rotational axis R. The serration 226 or the shaft 50 may have a structure with a plurality of continuous saw teeth having substantially a triangular cross section.

In an embodiment, the power supply unit 203 may receive power from the outside (e.g., the power supply device 111 of FIG. 2) and apply current to the motor assembly 201 and/or the clutch 250. For example, the coil 213 of the motor assembly 201 may be composed of a group of three-phase coils 213. The power supply unit 203 may apply alternating current (AC) current to the coil 213 to electromagnetically interact with the coil 213 or the rotor 220, generating electromagnetic force.

In an embodiment, the motor assembly 201 may include a stator 210 or a rotor 220. The rotor 220 may rotate about the rotational axis R. The stator 210 may be spaced apart from the rotor 220 and fixed. In an embodiment, in the motor assembly 201, the coil 213 disposed to surround the stator 210 or a magnet 221 disposed on the rotor 220 electromagnetically interact to generate power. In an embodiment, the motor assembly 201 may be a permanent magnet synchronous motor including a plurality of magnets 221 in which the rotor 220 is composed of permanent magnets.

For example, if a current is applied to the coil 213, the coil 213 and the plurality of magnets 221 may interact electromagnetically to rotate the rotor 220. The shaft 50 may connect the rotor 220 and an external device. The motor assembly 201 may generate power to rotate the external device. Hereinafter, as the external device to which the motor assembly 201 transfers power, the drum (e.g., the drum 20 of FIGS. 1 and 2) of the clothing treatment device (e.g., the clothing treatment device 100 of FIGS. 1 to 3) is exemplified but, without limitations thereto in actual implementation, the external device may be various devices, such as a fan (not shown) or a wheel (not shown).

In an embodiment, the motor assembly 201 may be an outer rotor-type motor assembly 201 in which the stator 210 is positioned in the center, and at least some elements (e.g., the rotor 220 assembly and/or the plurality of magnets 221) of the rotor 220 is positioned to surround the stator 210 so that the rotor 220 is rotated in the circumferential direction around the shaft 50 along the outer circumferential surface of the stator 210. The diameter of the rotor 220 in the circumferential direction of the outer rotor-type motor assembly 201 may be relatively large, and torque density or output density may be high as compared with the inner rotor-type motor assembly.

In an embodiment, the stator 210 may have an annular structure. The stator 210 may include a center area (e.g., the center area 214 of FIG. 5) adjacent to the rotational axis R, or a plurality of teeth areas (e.g., the plurality of teeth areas 215 of FIG. 5) extending from the center area 214 in a direction (e.g., U-V plane direction) parallel to the rotational axis R.

In an embodiment, the clutch 250 may be coupled to the center area 214 of the stator 210. Each of the plurality of teeth areas 215 may include a core 211 or an insulator 230 coated on the core 211 or a coil 213 wound around the insulator 230 in a direction surrounding the core 211.

In an embodiment, the insulator 230 may surround at least a portion of the stator 210 and support components of the stator 210. The insulator 230 may form the exterior of the stator 210. The insulator 230 may be formed of an insulator to prevent current loss.

In an embodiment, the coil 213 may be a conductive wire repeatedly wound around the outer circumferential surface of the core 211 or the insulator 230. The coil 213 may be formed on the outer circumferential surface of the insulator 230 in a form in which a conductive plate surrounds the core 211.

In an embodiment, in an area corresponding to an outer circumferential surface in one direction opposite to the rotational axis R in the plurality of tooth areas 215, a partial area of the insulator 230 may be opened to expose at least a partial area of the core 211 to the outside in the circumferential direction. The area where the core 211 is exposed may face the magnet 221 of the rotor 220 at a predetermined interval. In an embodiment, the plurality of magnets 221 may be disposed to surround the outer circumferential surface of the stator 210.

In an embodiment, the rotor 220 may include a rotor frame 225 or a plurality of magnets 221. The plurality of magnets 221 may be arranged in a circumferential direction surrounding the shaft 50. The rotor frame 225 may support the plurality of magnets 221.

In an embodiment, the plurality of magnets 221 may be disposed inside the sidewall of the rotor frame 225 and be supported by the rotor frame 225. The plurality of magnets 221 may be disposed to face the core 211 of the stator 210. The plurality of magnets 221 may electromagnetically interact with the coil 213 or core 211 of the stator 210.

In an embodiment, the shaft 50 may rotate about the rotational axis R of the motor assembly 201. The shaft 50 may transfer power to the drum 20. For example, the shaft 50 may be coupled to the rear portion of the drum 20 (e.g., the rear portion 20*b* of FIG. 2). The shaft 50 may transfer power according to driving of the motor assembly 201 to the drum 20 to rotate the drum 20.

In an embodiment, when the clothing treatment device 100 includes a pulsator (not shown), the pulsator (not shown) may be installed on the inner bottom surface of the drum 20. The pulsator (not shown) may be coupled to the shaft 50. The motor assembly 201 may transfer power to the pulsator (not shown) through the shaft 50 to rotate the pulsator (not shown).

The foregoing description of the driving device 200 is an exemplary description for implementing the driving device 200 according to an embodiment of the disclosure and, without limitations thereto in actual implementation, various changes or modifications may be made to the configuration or driving of the components of the driving device 200.

Hereinafter, in describing the driving device 200 or the clothing treatment device 100 including the driving device 200 according to an embodiment, for convenience of description, the content overlapping the above description will be omitted from the description.

Figure 5:
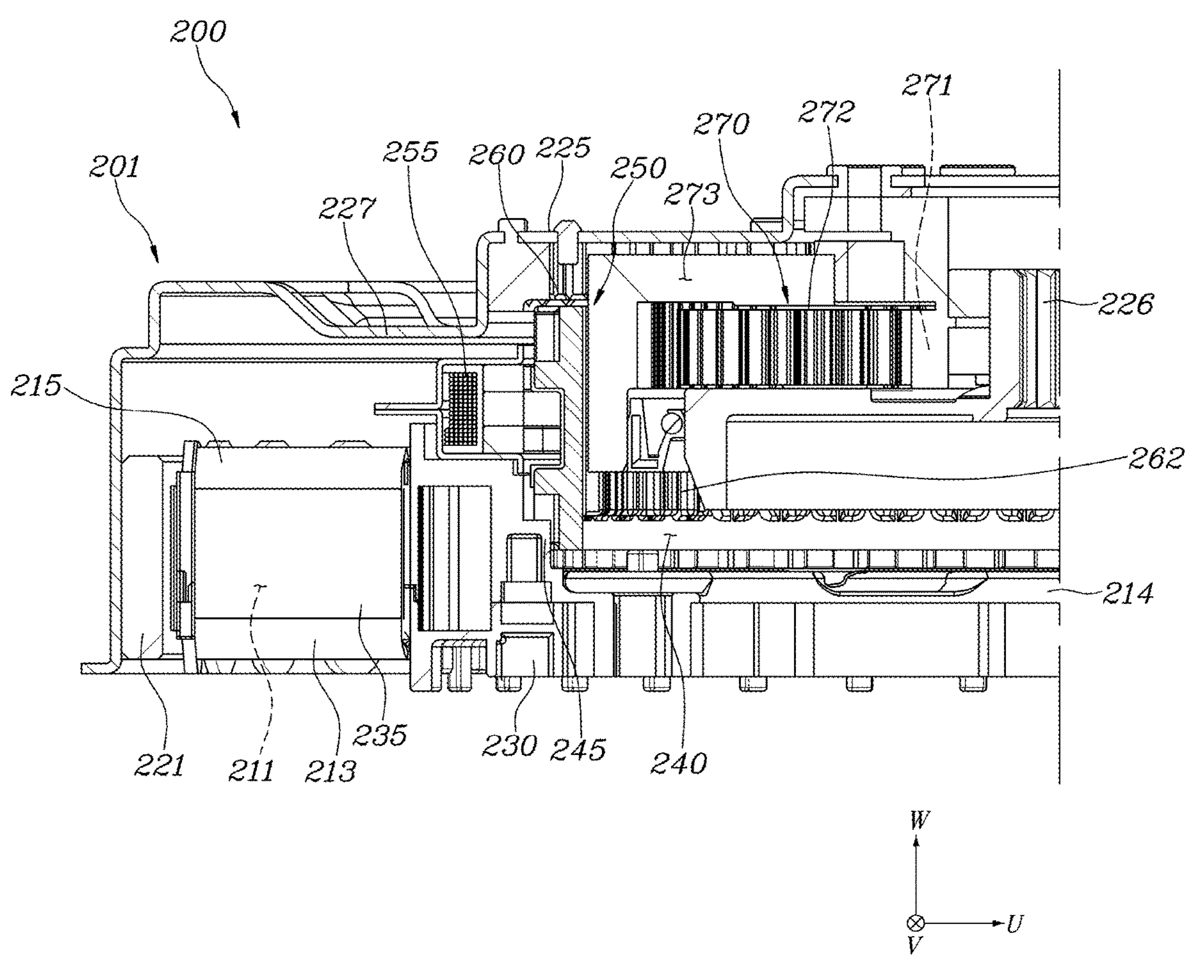
FIG. 5 is a cross-sectional view illustrating a driving device according to an embodiment of the disclosure.

FIG. 5 is a cross-sectional view illustrating a driving device 200 according to an embodiment of the disclosure. Specifically, FIG. 5 is a cross-sectional view in one direction (e.g., +V direction), as taken along line A-A' of FIG. 4A.

Referring to FIG. 5, in an embodiment, the rotor frame 225 may receive at least some of the stator 210, the clutch 250 or the reduction gear 270.

In an embodiment, the reduction gear 270 may include at least some of a sun gear 271, a satellite gear 272 or an internal gear 273. In an embodiment, the sun gear 271 may be disposed to surround the serration 226. A plurality of satellite gears 272 may be disposed to engage with the sun gear 271. The internal gear 273 may be disposed to surround the plurality of satellite gears 272 to engage with the plurality of satellite gears 272.

In an embodiment, the reduction gear 270 may be disposed in an area adjacent to the rotational axis R of the stator 210, e.g., in the center area 214. The reduction gear 270 may be received inside the rotor 220 case. In an embodiment, when a movable member 260 slides, the meshing structure or rotation direction of the gears 271, 272, and 273 including the reduction gear 270 may be changed. Based on this, the reduction gear 270 may connect the rotor 220 or the shaft 50 to decelerate the shaft 50.

In an embodiment, the clutch 250 may include the movable member 260 or a non-movable member 255. The movable member 260 may slide in a direction (e.g., +/−W direction) horizontal to the rotational axis R. The non-movable member 255 may be fixedly disposed to some components of the driving device 200 and slide the movable member 260. For example, the internal gear 273 of the reduction gear 270 may be connected to the movable member 260 of the clutch 250. If the movable member 260 slides, the internal gear 273 moves together, and the meshing state of the other gears 271 and 272 may be changed.

In an embodiment, the clutch 250 may be disposed around the reduction gear 270. The clutch 250 may be received inside the rotor 220 case. For example, in the clutch 250, the movable member 260 may be disposed in the outer circumferential direction of the internal gear 273 of the reduction gear 270. The non-movable member 255 may be fixed to the stator 210 of the driving device 200 through the insulator 230.

According to an embodiment, the clutch 250 or reduction gear 270 is not limited to the structure shown in the drawings, but may be implemented in various structures to achieve their intended purposes. The example driving of the exemplary clutch 250 or reduction gear 270 is described below in connection with FIG. 7A.

In an embodiment, the insulator 230 may include an insulating area 235, a coupling area 240 or a connection member 245. The insulating area 235 may be formed on the teeth area 215 of the stator 210. The insulating area 235 may include receiving recesses 235*a* respectively corresponding to the plurality of teeth areas 215. For example, the insulating area 235 may include the receiving recess 235*a* for receiving the core 211 of the stator 210 and may be provided to surround the outer circumferential surface of the core 211. The coil 213 may be wound on the outer circumferential surface of the receiving recess 235*a* of the insulating area 235. The coupling area 240 may be formed in the center area 214 of the stator 210 and may receive the clutch 250. The connection member 245 may be provided in the coupling area 240 and may protrude towards the shaft 50 to engage with the movable member 260 when the movable member 260 of the clutch 250 slides.

In an embodiment, the coupling area 240 may be open from the top surface 230*a* of the insulator 230 downward (e.g., −W direction). The coupling area 240 may receive at least a partial area of the clutch 250 or the reduction gear 270. In an embodiment, the insulator 230 may receive at least a partial area of the reduction gear 270 or clutch 250 inside the coupling area 240. The insulator 230 may omit a separate coupling member (not shown) for coupling the clutch 250. The insulator 230 may reduce the height occupied by the driving device 200 in the vertical direction (e.g., +/−W direction).

In an embodiment, when the driving device 200 is thinned, the space occupied by the driving device 200 in the clothing treatment device 100 is reduced, enhancing space efficiency. In this case, the distance (e.g., the second width B of FIG. 2) between the driving device 200 and the main body (e.g., the main body 10 of FIG. 2) may be increased. A space with a certain interval may be secured from the driving device 200, and component damage due to vibration may be prevented in the clothing treatment device 100. The driving device 200 may be thinned, and the height of the rotor frame 225 may be reduced. If the rotor frame 225 is downsized, the overall weight of the driving device 200 is reduced, reducing material costs.

As an example, a driving device 200 installed in the clothing treatment device 100 when the clothing treatment device 100 is a household washer is described. If the insulator 230 includes the coupling area 240 and couples with the clutch 250, the distance (e.g., the first width A of FIG. 2) from the rear surface of the tub (e.g., the tub 15 of FIG. 2) of the driving device 200 to the rear surface of the driving device 200 may be shortened by a predetermined distance (e.g., 17 mm) as compared with when a separate coupling member (not shown) is included. The distance (e.g., the second width B of FIG. 2) between the driving device 200 and the main body 10 may increase accordingly. In this case, a space for preventing damage due to the vibration of the driving device 200 may be secured.

In an embodiment, the clutch 250 or reduction gear 270 may be coupled to be built into the motor assembly 201. The length of the driving device 200 in the vertical direction (e.g., the +W direction) may be reduced, so that the driving device 200 may be made thinner or smaller. In an embodiment of the disclosure, the insulator 230 of the motor assembly 201 may include a structure for receiving and supporting the clutch 250 and/or the reduction gear 270, so that the driving device 200 may be thinned.

In an embodiment, the rotor frame 225 may have a cylindrical shape to receive the stator 210 and to have the inside open to rotate about the rotational axis R. In an embodiment, a space for receiving the clutch 250 or the reduction gear 270 may be formed between the coupling area 240 of the insulator 230 and the rotor frame 225. The rotor frame 225 may include a spoke 227 on an upper surface facing the teeth area 215 of the stator 210. A plurality of magnets 221 may be disposed on an inner surface of the rotor frame 225 to face the core 211 of the stator 210.

Figure 6A:
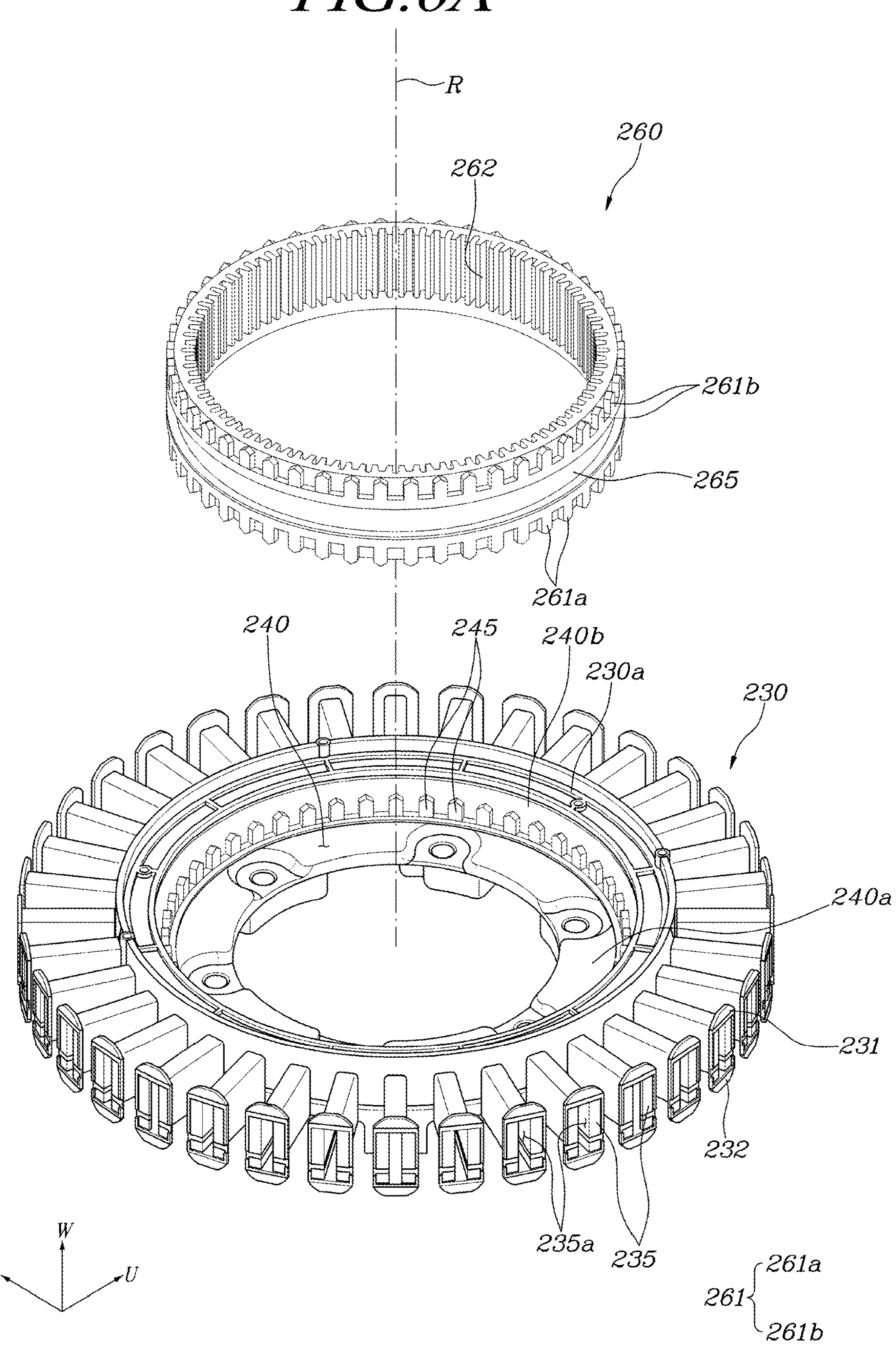
FIG. 6A is an exploded perspective view illustrating an insulator and a movable member according to an embodiment of the disclosure.
Figure 6B:
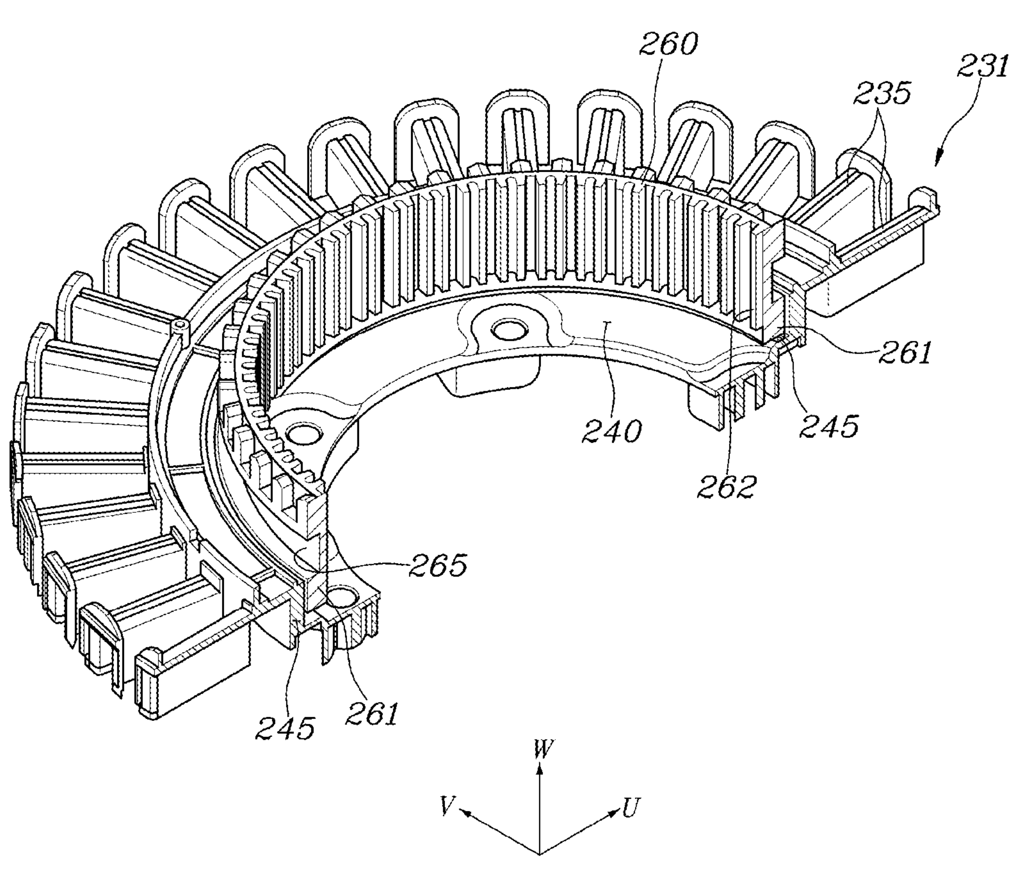
FIG. 6B is a cross-sectional view illustrating an insulator and a movable member according to an embodiment of the disclosure.

FIG. 6A is an exploded perspective view illustrating an insulator 230 and a movable member 260 according to an embodiment of the disclosure. FIG. 6B is a cross-sectional view illustrating an insulator 230 and a movable member 260 according to an embodiment of the disclosure.

Referring to FIGS. 6A and 6B, in an embodiment, the insulator 230 may include a coupling area 240 or a connection member 245. The movable member 260 may include a locking recess 261.

In an embodiment, the insulator 230 may include a coupling area 240 that is open inwardly from the upper surface 230*a* to receive the clutch 250. In an embodiment, the upper surface 230*a* of the insulator 230 may be one surface facing in one direction (e.g., +W direction) or one surface facing the rotor frame 225. When the driving device 200 is installed in the clothing treatment device (e.g., the clothing treatment device 100 of FIG. 2), the upper surface 230*a* of the insulator 230 may be one surface facing the tub (e.g., the tub 15 of FIG. 2) or its opposite surface.

In an embodiment, the coupling area 240 may have an opening or groove structure formed in a circumferential direction surrounding the rotational axis R. The coupling area 240 may include a bottom surface 240*a* facing the top surface 230*a* or a side wall 240*b* extending in a circumferential direction surrounding a rotational axis R (or shaft 50) from the bottom surface 240*a*.

In an embodiment, the insulator 230 may include a connection member 245 that is provided in the coupling area 240 and protrudes to engage with the movable member 260 when the movable member 260 slides.

In an embodiment, the connection member 245 may be connected to both the bottom surface 240*a* or the sidewall 240*b* of the coupling area 240 and may protrude in the rotational axis (R) direction. However, without limitations thereto in actual implementation, the connection member 245 may protrude from either the bottom surface 240*a* or the sidewall 240*b* of the coupling area 240. In an embodiment, the connection member 245 may protrude from the sidewall 240*b* in the rotational axis (R) direction. The connection member 245 may protrude from the bottom surface 240*a* toward the top surface 230*a* (e.g., +W direction).

In an embodiment, if the movable member 260 of the clutch 250 slides in the vertical direction, the lower surface of the movable member 260 in the lower direction (e.g., −W direction) may be moved toward the bottom surface 240*a* of the coupling area 240, and the connection member 245 and the locking recess 261 may be fastened. In an embodiment, the connection member 245 and the locking recess 261 may be mutually engaged and fixed in a horizontal direction (e.g., the U-V plane direction) or a circumferential direction.

In an embodiment, the insulator 230 may include a plurality of connection members 245. The plurality of connection members 245 may be spaced apart from each other in a circumferential direction to surround the rotational axis R.

In an embodiment, the connection member 245 may include a plurality of protrusions. The plurality of protrusions may be arranged to be spaced apart from each other in a circumferential direction surrounding the rotational axis R.

In an embodiment, the connection member 245 may be positioned below the core 211 of the stator 210 with respect to the upper surface 230*a* of the insulator 230. For example, the coupling area 240 may be open to a certain width or more internally from the upper surface 230*a* of the insulator 230. The coupling area 240 may be open to a depth lower than the depth at which the core 211 of the stator 210 is positioned, for example.

In an embodiment, the connection member 245 may be disposed below the core 211 of the stator 210. The clutch 250 may slide to the depth where the connection member 245 is positioned. The coupling area 240 in an embodiment may support the clutch 250 to a location deep within the insulator 230. As compared to an embodiment in which the clutch 250 of the same height is received, the overall height of the driving device 200 may be further reduced, and the driving device 200 may be thinned.

In an embodiment, the insulator 230 is injection-molded into a single body from the insulating area 235 surrounding the core 211 of the stator 210 to the coupling area 240 including the connection member 245. The insulator 230 may be formed of a material having insulation properties and enhanced rigidity.

In an embodiment, the movable member 260 may include at least some of a locking recess 261, a slide guide 262, or a slider 265. As the movable member 260 slides in a direction (e.g., +/−W direction) horizontal to the rotational axis R, the locking recess 261 is coupled with, or separated from, the connection member 245 or the coupling protrusion (2251 of FIG. 10A). For example, the locking recess 261 may include a first locking recess 261*a* that is coupled with or separated from the connection member 245 or a second locking recess 261*b* that is coupled with or separated from the coupling protrusion (the coupling protrusion 2251 of FIG. 10A). The locking recess 261 may have a shape or structure corresponding to the connection member 245 or the coupling protrusion 2251. For example, the locking recess 261 may be formed to protrude from the outer surface of the movable member 260 in a circumferential direction.

In an embodiment, the slide guide 262 may guide the movable member 260 to slide in a designed direction or position. The slide guide 262 may be implemented as a groove structure. The slide guide 262 of an embodiment may have a bending structure corresponding to the outer circumferential surface of the internal gear 273 to be connected to the internal gear 273 of the reduction gear 270. Slide guides 262 may be disposed at regular intervals in the circumferential direction on the inner surface of the movable member 260.

In an embodiment, the slider 265 may be formed on the outer circumferential surface of the movable member 260 and interact with the non-movable member 255 to slide the movable member 260. For example, in a solenoid-type or electromagnetic clutch 250, the slider 265 may be formed of a metal or magnetic substance. The slider 265 may be implemented as a groove structure and include a metal or magnetic substance. For example, the slider 265 may be formed in a circumferential direction on the outer circumferential surface of the movable member 260 to face the clutch magnet (e.g., the clutch magnet 258 of FIG. 7A) of the non-movable member 255.

In an embodiment of the disclosure, the driving device 200 may include a coupling area 240 provided to be open in the inside of the insulator 230. The driving device 200 may receive the clutch 250 and/or the reduction gear 270 in the coupling area 240. In this case, the overall height of the driving device 200 may be reduced, so that the driving device 200 may be thinned.

In an embodiment, a separate clutch engaging member (not shown) may be fastened to the upper surface 230*a* of the insulator 230. The clutch 250 may be fastened to the clutch engaging member (not shown). In the case of including a clutch engaging member (not shown), the insulator 230, the clutch engaging member (not shown) or the clutch 250 may have a stacked structure. In this case, the overall height of the driving device 200 may be increased, rendering it difficult to thin the driving device 200.

In an embodiment, as compared to the case of including a clutch engaging member (not shown), if the insulator 230 includes the coupling area 240 to receive the clutch 250, the height of the insulator 230 and the height of the clutch 250 may overlap at least in part, reducing the overall height of the driving device 200.

In an embodiment, when a clutch engaging member (not shown) is included, the driving device 200 may include a first fastening area (not shown) to fix the insulator 230 and the engaging member (not shown) or a second fastening area (not shown) to fix the clutch engaging member (not shown) and the clutch 250. When the insulator 230 includes the coupling area 240 to receive the clutch 250, at least some of the fastening areas (not shown) may be omitted, and direct connection may be made with the insulator 230 or the clutch 250 through the connection member 245. In an embodiment, when the number of fastening areas (not shown) is reduced and integrally connected, rigidity may be relatively enhanced, and the durability of the driving device 200 may be enhanced.

In an embodiment, as compared to the case of including a clutch engaging member (not shown), if the insulator 230 includes the coupling area 240 to receive the clutch 250, the insulator 230 intended for insulation purposes may be applied for coupling purposes, rendering it possible to omit the component or assembly process to assemble the driving device 200. In this case, it is possible to simplify the device manufacturing process, reduce manufacturing costs, or secure manufacture economy or efficiency.

Figure 7A:
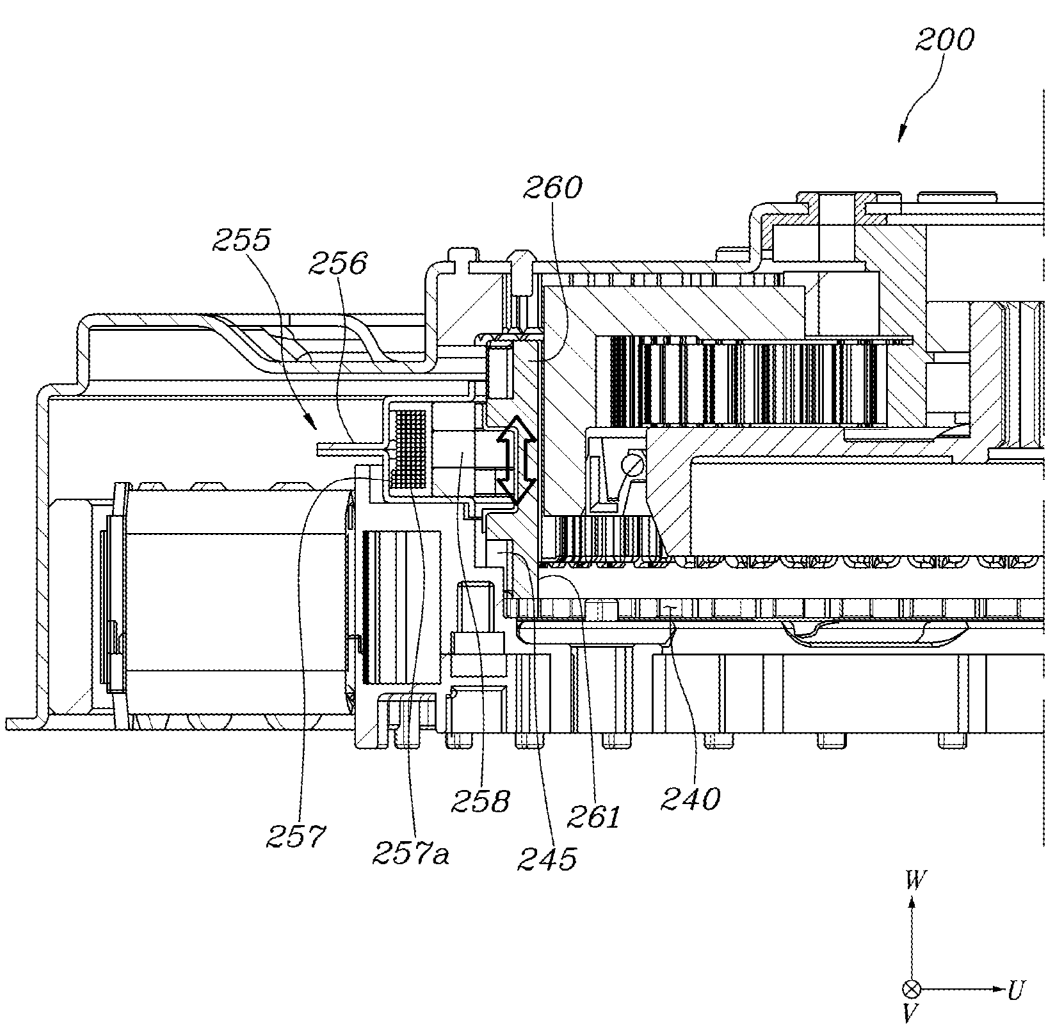
FIG. 7A is a cross-sectional view illustrating a partial area of a driving device according to an embodiment of the disclosure.
Figure 7B:
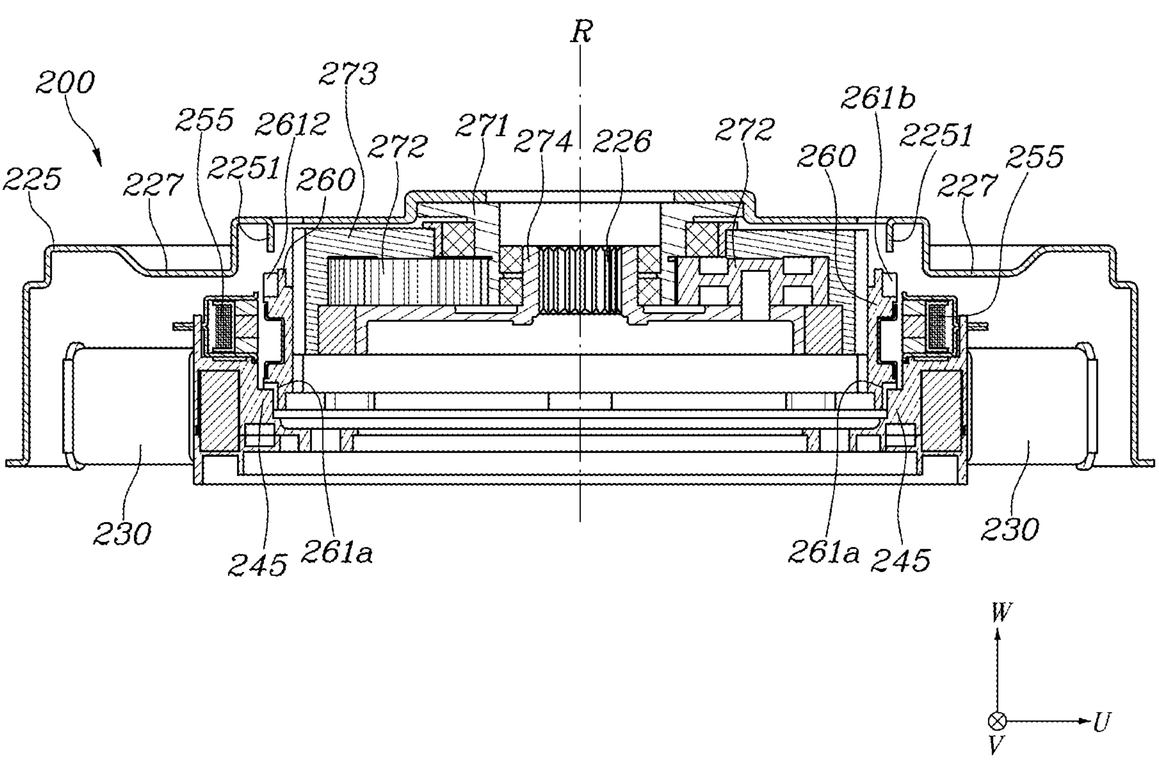
FIG. 7B is a cross-sectional view illustrating a driving device according to an embodiment of the disclosure, during a washing operation.
Figure 7C:
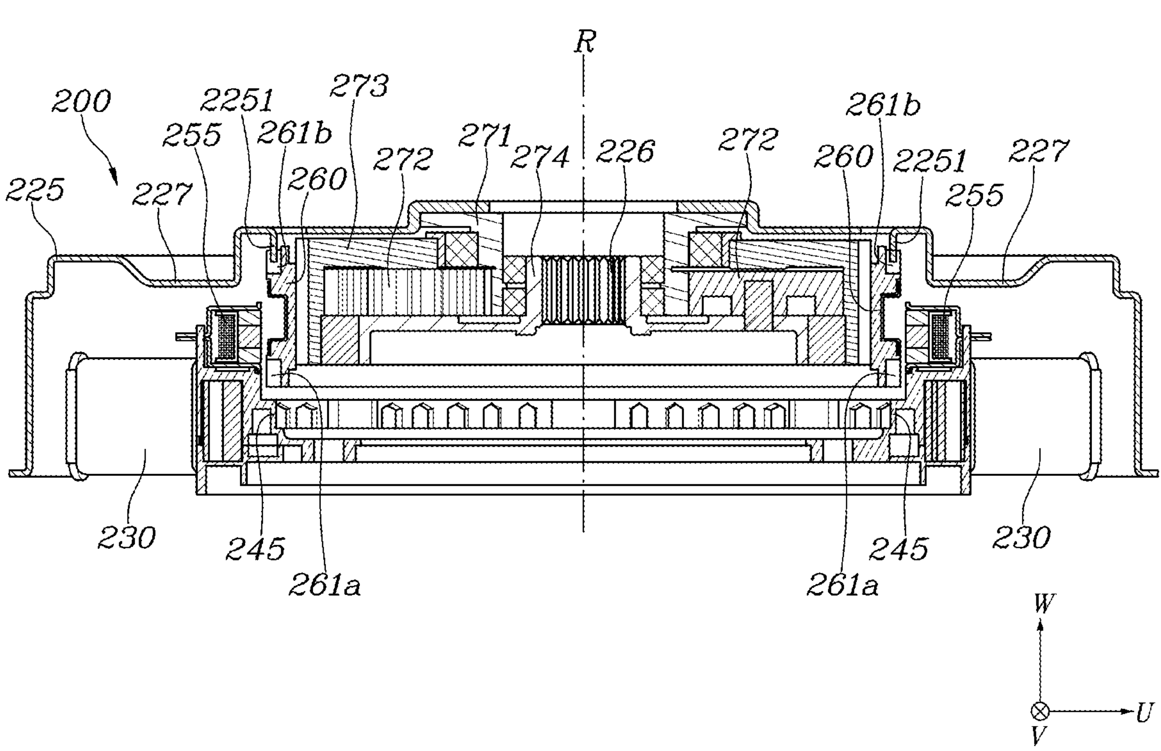
FIG. 7C is a cross-sectional view illustrating a driving device according to an embodiment of the disclosure, during a spin-drying operation.
Figure 7D:
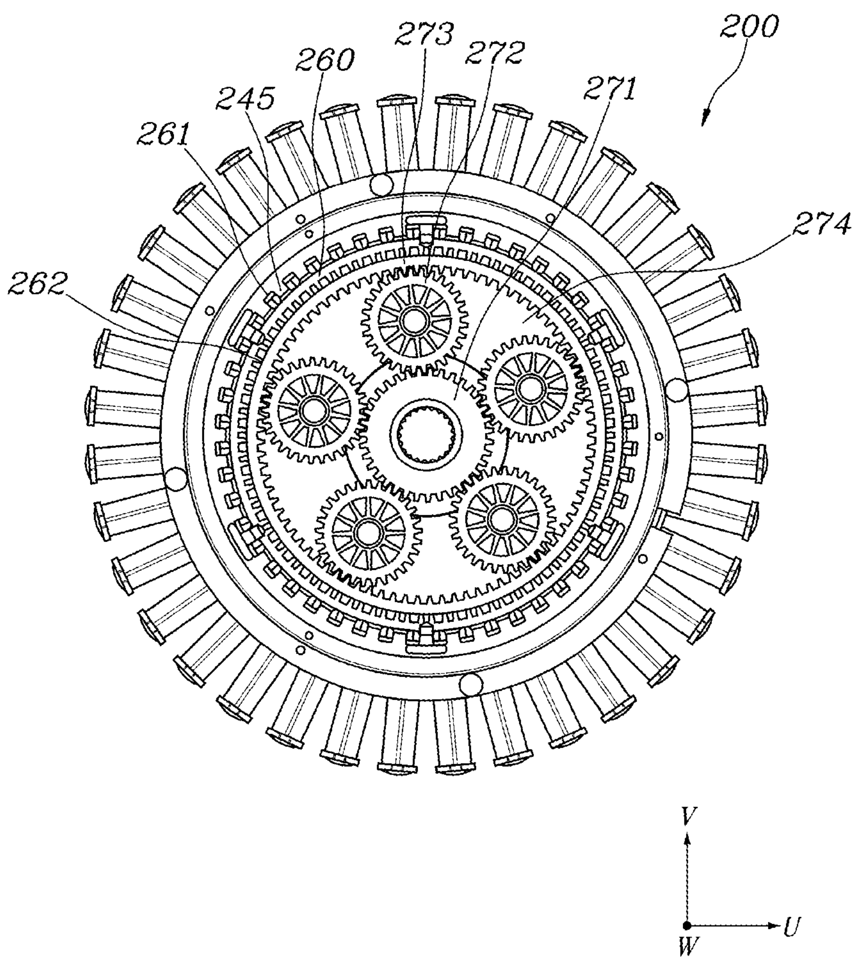
FIG. 7D is a cross-sectional view illustrating a driving device according to an embodiment of the disclosure.

FIG. 7A is a cross-sectional view illustrating a partial area of a driving device 200 according to an embodiment of the disclosure. FIG. 7B is a cross-sectional view illustrating a driving device 200 according to an embodiment of the disclosure, during a washing operation. FIG. 7C is a cross-sectional view illustrating a driving device 200 according to an embodiment of the disclosure, during a spin-drying operation. FIG. 7D is a cross-sectional view illustrating a driving device 200 according to an embodiment of the disclosure.

Referring to FIGS. 7A to 7D, the non-movable member 255 of the clutch 250 may be an electronic or solenoid-type clutch 250 including a clutch coil 257 or a clutch magnet 258. The reduction gear 270 may include a plurality of gears 271, 272, and 273.

In an embodiment, the clutch 250 may include a non-movable member 255 that slides the movable member 260 and is fixedly installed to the driving device 200. The non-movable member 255 of an embodiment may be implemented in various ways based on the driving type of the clutch 250. Although the solenoid type is shown as an embodiment of the clutch 250 in the drawings, it is not limited thereto and may be implemented in various ways. For example, the drive type of the clutch 250 may be at least one of a switching type, a cap type, or a spring type.

In an embodiment, the non-movable member 255 may include a fixing case 256 fixed to the stator 210 and/or the insulator 230. In the embodiment of the solenoid-type clutch 250, at least some of the clutch coil 257, the coil support 257*a* or the clutch magnet 258 may be disposed inside the fixing case 256.

In an embodiment, the clutch coil 257 may receive power through the power supply unit 203. The clutch coil 257 may be controlled by a processor (e.g., the processor 140 of FIG. 3). If current flows through the clutch coil 257, the non-movable member 255 may electromagnetically interact with the clutch magnet 258 to form an electromagnetic force. The clutch coil 257 may have a plurality of windings provided in a circumferential direction around the rotational axis R. The coil support 257*a* may support the clutch coil 257 and may partition the clutch coil 257 and the clutch magnet 258.

In an embodiment, the non-movable member 255 may move the slider 265 through the electromagnetic force of the clutch coil 257 or the clutch magnet 258. For example, current may be applied to the clutch coil 257 alternatively in a clockwise or counterclockwise direction with respect to the rotational axis R. Based on this, the direction of the electromagnetic force of the non-movable member 255 may be changed.

In an embodiment, the movable member 260 of the clutch 250 may be raised and lowered in a vertical direction (e.g., +/−W direction) by the electromagnetic force formed in the non-movable member 255. In the movable member 260, a plurality of locking recesses 261 may be formed in the connection member 245 direction (e.g., −W direction) or in the opposite direction (e.g., +W direction). In an embodiment, while the movable member 260 moves in both directions, some of the plurality of locking recesses 261 may be locked and others may be unlocked.

For example, as shown in FIG. 7B, if the movable member 260 descends toward the connection member 245 (hereinafter, a 'first mode' or 'washing cycle'), the lower locking recess 261*a* may be locked to the connection member 245, and the upper locking recess 261*b* may be unlocked from the rotor 220 and/or the rotor frame 225. The movable member 260 may be fixed to the stator 210 and/or the insulator 230.

For example, as shown in FIG. 7C, if the movable member 260 ascends in the opposite direction to the connection member 245 (hereinafter, a 'second mode' or 'spin-drying cycle'), the lower locking recess 261*a* may be unlocked from the connection member 245, and the upper locking recess 261*b* may be locked to the rotor frame 225. The movable member 260 may be connected to the rotor 220 and rotate together with the rotor 220.

In an embodiment, the reduction gear 270 may include a plurality of gears 271, 272, and 273 or a carrier 274.

For example, the plurality of gears 271, 272, and 273 may include a sun gear 271 and an internal gear 273 or a satellite gear 272 spaced apart from the sun gear 271 by a predetermined interval and disposed to surround the sun gear 271. The satellite gear 272 may be disposed between the sun gear 271 and the internal gear 273 to be engaged therewith. In an embodiment, the sun gear 271 or the internal gear 273 may be disposed around the rotational axis R. The internal gear 273 may have a larger diameter than the sun gear 271.

In an embodiment, the carrier 274 may be fixedly connected to the rotor frame 225 or the serration 226. The carrier 274 may be rotated together in conjunction with the shaft 50. In an embodiment, the carrier 274 may be coupled with a plurality of satellite gears 272. The rotational force of the shaft 50 and/or the drum 20 may be weakened in conjunction with the rotation of the plurality of satellite gears 272 through the carrier 274.

In an embodiment, the plurality of gears 271, 272, and 273 may be disposed inside the movable member 260 of the clutch 250. The internal gear 273 may be tightly coupled to the movable member 260 of the clutch 250. The internal gear 273 may slide together in conjunction with the movable member 260. For example, the outer circumferential surface of the internal gear 273 and the slide guide 262 of the movable member 260 may be formed in structures corresponding to each other to be engaged with each other.

In an embodiment, the internal gear 273 may change to a rotating state or a fixed state in conjunction with the movement of the movable member 260. For example, in the first mode (e.g., a state in which the movable member 260 is locked to the connection member 245 and fixed to the stator 210), the internal gear 273 may become the fixed state and, in the second mode (e.g., a state in which the movable member 260 is locked to the rotor frame 225 and connected to the rotor 220), the internal gear 273 may become the rotating state.

Referring to FIG. 7B, in an embodiment, in the first mode (or washing cycle), as described above, the movable member 260 descends toward the connection member 245, and the first locking recess 261*a* of the movable member 260 may be locked to the connection member 245. In this case, if the sun gear 271 is rotated in conjunction with the shaft 50, the internal gear 273 may be fixed, and the plurality of satellite gears 272 may be engaged with the sun gear 271 and rotate while orbiting the sun gear 271. For example, if the sun gear 271 rotates clockwise around the rotational axis R, the plurality of satellite gears 272 may rotate counterclockwise around the rotational axis R. In conjunction with this, the carrier 274 or shaft 50 may rotate in a reduced state.

Referring to FIG. 7C, in an embodiment, in the second mode (or spin-drying cycle), as described above, the movable member 260 ascends toward the rotor frame 225, and the second locking recess 261*b* of the movable member 260 may be locked to the coupling protrusion 2251. If the sun gear 271 is rotated in conjunction with the shaft 50, the internal gear 273 may be rotated in conjunction with the rotor 220, and the plurality of satellite gears 272 may be rotated in conjunction with the sun gear 271 or the internal gear 273. For example, if the sun gear 271 rotates clockwise around the rotational axis R, the internal gear 273 may rotate clockwise, and the plurality of satellite gears 272 may also rotate clockwise around the rotational axis R. In conjunction with this, the carrier 274 or the shaft 50 may rotate without deceleration or at a constant speed.

In an embodiment of the disclosure, the driving device 200 may be installed in the clothing treatment device (e.g., the clothing treatment device 100 of FIGS. 1 to 3). The clothing treatment device 100 may include a processor 140 that controls driving of the driving device 200. The processor 140 may slide the movable member 260 corresponding to a plurality of courses performed by the clothing treatment device 100.

In an embodiment, the clothing treatment device 100 may perform a plurality of courses, e.g., a washing cycle or a spin-drying cycle. The processor 140 may control the driving device 200 to switch between the first mode and the second mode, enhancing the driving efficiency of the motor assembly 201.

In an embodiment, if the clothing treatment device 100 performs the spin-drying cycle, the drum 20 may rotate at high speed. In contrast, if the clothing treatment device 100 performs the washing cycle, the drum 20 may have to rotate at a relatively low speed. For example, when the clutch 250 or the reduction gear 270 is not included, the operating point of the motor assembly 201 in the washing cycle may be in a low-speed (e.g., about 45 rpm), high-torque (e.g., about 31.4 Nm) state. In this case, power loss due to copper loss may increase.

In an embodiment, if the clothing treatment device 100 performs a spin-drying cycle, the driving device 200 may switch the clutch 250 or the reduction gear 270 to the second mode, so that the motor assembly 201 or the drum 20 may rotate at high speed. If the clothing treatment device 100 performs a washing cycle, the driving device 200 may switch the clutch 250 or the reduction gear 270 to the first mode, driving in a state in which the operating point of the motor assembly 201 is in a high-speed (e.g., about 158 rpm), low-torque (e.g., about 8.9 Nm) state. In this case, power loss may be reduced by rotating the drum 20 at a low speed.

Figure 8A:
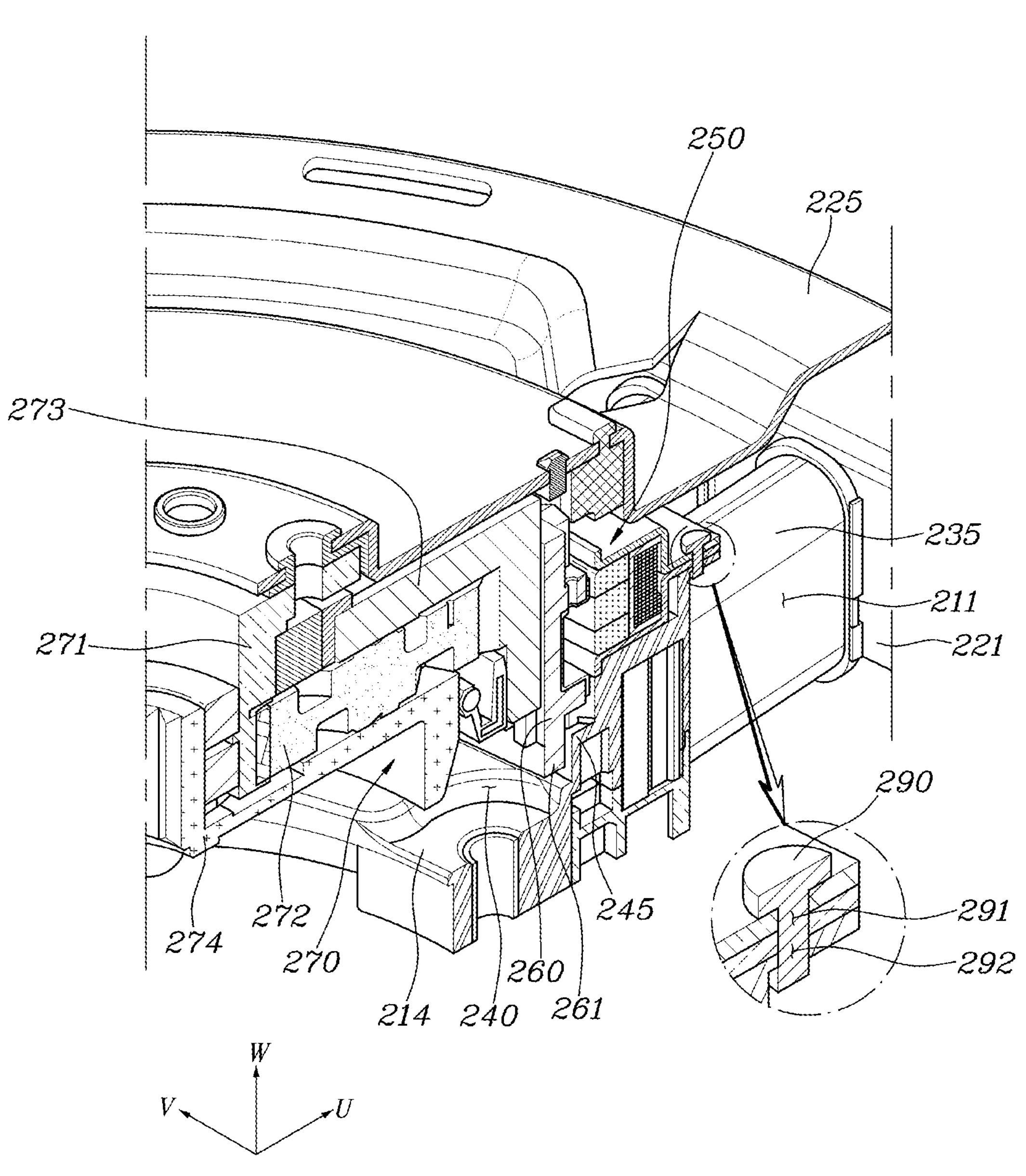
FIG. 8A is a cross-sectional view illustrating a partial area of a driving device according to an embodiment of the disclosure.
Figure 8B:
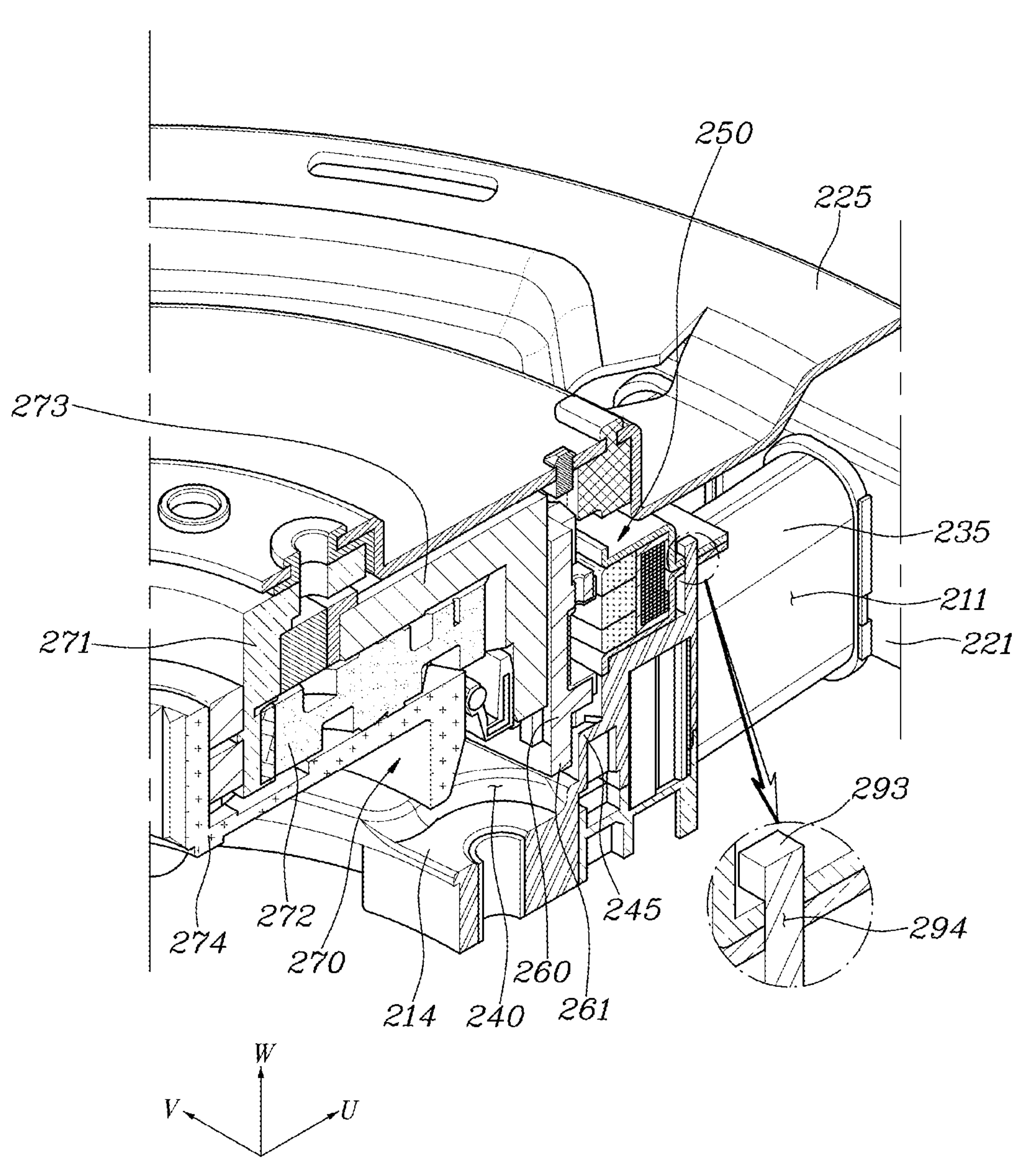
FIG. 8B is a cross-sectional view illustrating a partial area of a driving device according to an embodiment of the disclosure.

FIG. 8A is a cross-sectional view illustrating a partial area of a driving device 200 according to an embodiment of the disclosure. FIG. 8B is a cross-sectional view illustrating a partial area of a driving device 200 according to an embodiment of the disclosure.

Referring to FIGS. 8A and 8B, the driving device 200 according to an embodiment may include fixing members 290 and 293.

In an embodiment, the fixing members 290 and 293 may fix a partial area of the stator 210 or the clutch 250. For example, the fixing members 290 and 293 may fix the insulator 230 and the fixing case 256 of the non-movable member 255. The fixing members 290 and 293 may perform fixing in various ways. Hereinafter, embodiments are described with reference to drawings.

Referring to FIG. 8A, the fixing member 290 may be a bolt or nail having a head area or a pillar area. The clutch 250 may include a first fixing area 291 provided in the fixing case 256 of the non-movable member 255 and open to allow the fixing member 290 to pass therethrough. The insulator 230 may include a second fixing area 292 to which the fixing member 290 is fastened through the first fixing area 291.

In an embodiment, the fixing member 290 may pass through the first fixing area 291 or the second fixing area 292 simultaneously and be fixed, fixing the non-movable member 255 of the clutch 250 and the insulator 230.

In an embodiment, at least part of the first fixing area 291 or the second fixing area 292 may have a cross-sectional structure corresponding to the shape of the fixing members 290 and 293 to support the fixing member 290. For example, when the fixing member 290 is a bolt, the second fixing area 292 may have a nut structure with a thread to fix the fixing member 290.

Referring to FIG. 8B, the fixing member 293 may be a boss provided in the insulator 230 and protruding from the upper surface 230*a* toward the clutch 250. The clutch 250 may include a third fixing area 294 provided in the fixing case 256 of the non-movable member 255 and open to allow the fixing member 293 to pass therethrough. In an embodiment, the fixing member 293 may be fixed through at least a partial area of the third fixing area 294. The fixing member 293 may fix the non-movable member 255 of the clutch 250 and the insulator 230.

In an embodiment, when the insulator 230 may include the fixing member 293 that is a boss, the driving device 200 may omit the separate fixing members 290 and 293 for fastening the clutch 250 or a process for fastening them. The fixing member 293 may be integrally injection-molded with the insulator 230. The third fixing area 294 may couple the clutch 250 to the insulator 230 to be inserted into the fixing member 293, thereby fixing the clutch 250 in a relatively simplified manner.

Figure 9A:
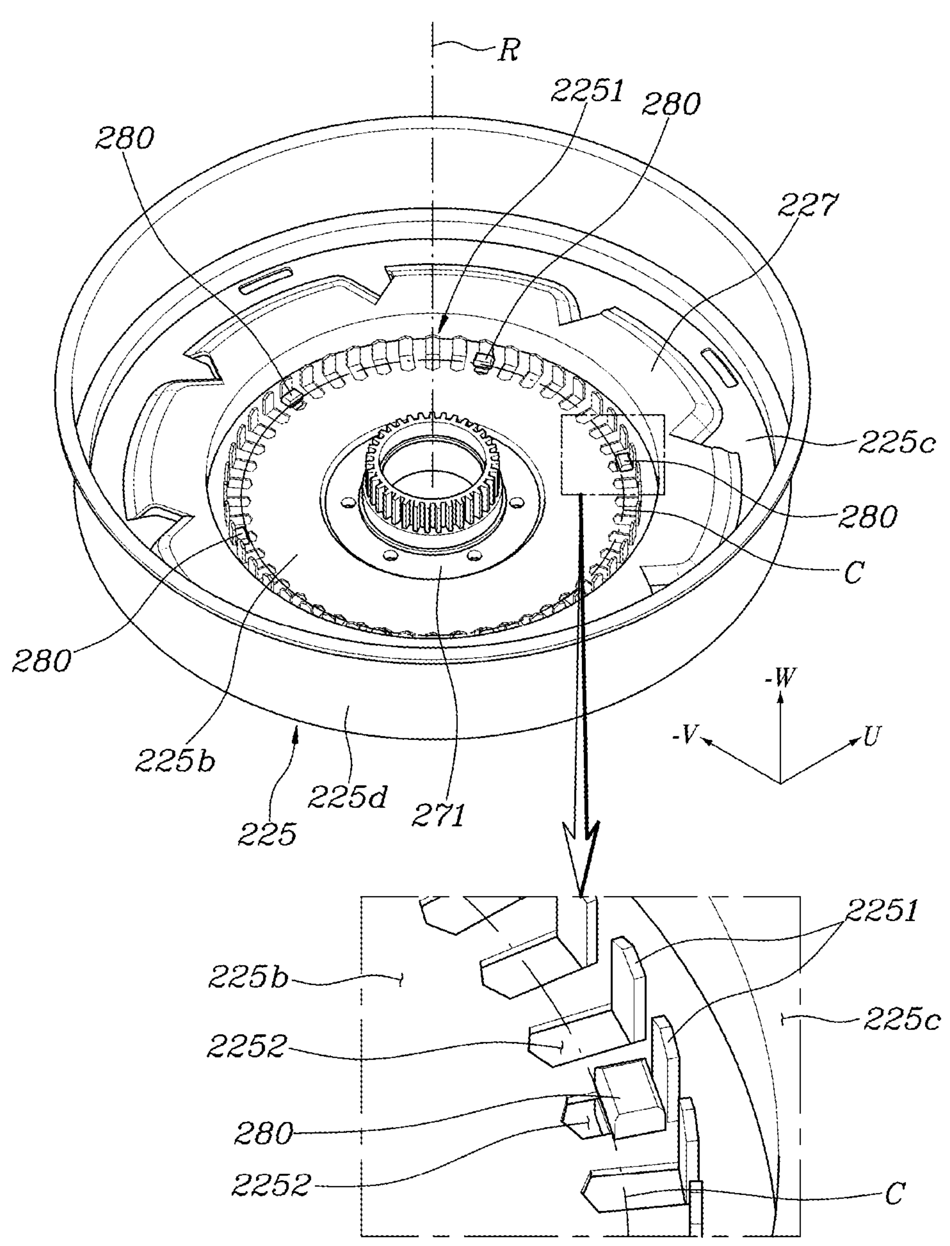
FIG. 9A is a whole or partial perspective view illustrating a rotor frame constituting a driving device according to an embodiment of the disclosure.
Figure 9B:
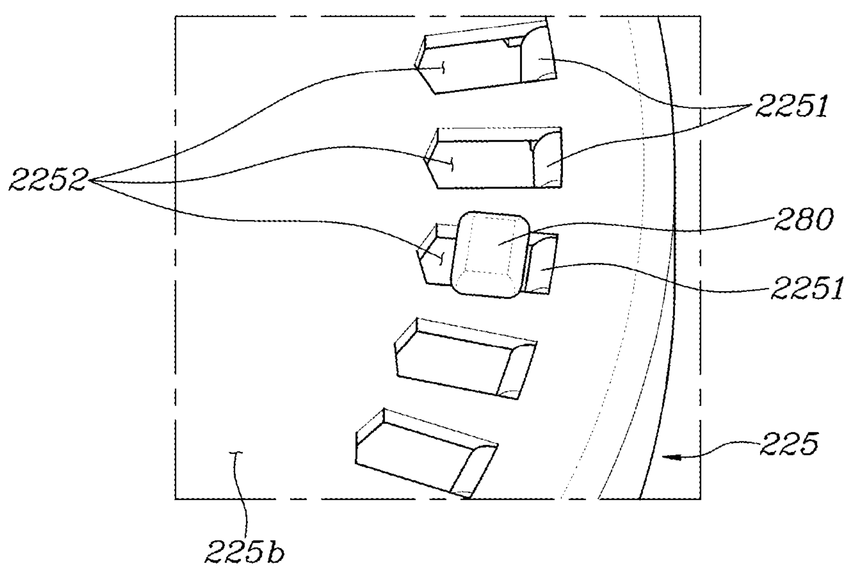
FIG. 9B is an enlarged view illustrating a portion of the rotor frame shown in FIG. 9A according to an embodiment of the disclosure.

FIG. 9A is a whole or partial perspective view illustrating a rotor frame constituting a driving device according to an embodiment of the disclosure. FIG. 9B is an enlarged view illustrating a portion of the rotor frame shown in FIG. 9A. The enlarged view shown in FIG. 9B assumes that a portion of the rotor frame is viewed in one direction (e.g., W direction).

Referring to FIGS. 9A and 9B, in an embodiment, the rotor frame 225 may be provided to receive the clutch (e.g., the movable member 260) or the reduction gear 270. According to an embodiment, the rotor frame 225 may be formed overall in a disk shape.

According to an embodiment, the rotor frame 225 may include a first part 225*a*, a second part 225*b*, a third part 225*c* or a fourth part 225*d*. According to an embodiment, the first part 225*a*, the second part 225*b*, the third part 225*c* or the fourth part 225*d* may be provided to form a step between the parts at the portion where the parts contact each other.

According to an embodiment, the first part 225*a* may form a central portion of the rotor frame 225. A shaft hole through which the shaft 50 passes may be formed in the first part 225*a*. According to an embodiment, the sun gear 271 of the reduction gear 270 may be seated on the first part 225*a*. The sun gear 271 may be coupled to the rotor frame 225 through a fastening member (e.g., a bolt). According to an embodiment, the sun gear 271 may be integrally formed with the rotor frame 225.

According to an embodiment, the second part 225*b* may be provided to form a predetermined step with the first part 225*a*. A plurality of coupling protrusions 2251 coupled with the movable member 260 according to the slide of the movable member 260 of the clutch 250 may be formed on the second part 225*b*.

According to an embodiment, the third part 225*c* may be provided to form a predetermined step with the second part 225*a*. The above-described spokes 227 may be formed in the third part 225*c*.

According to an embodiment, the fourth part 225*d* may protrude and extend in a vertical direction (e.g., −W direction) from the third part 225*c*. The fourth part 225*d* may be referred to as a sidewall of the rotor frame 225. The fourth part 225*d* may form an outer circumference of the rotor frame 225.

According to an embodiment, the rotor frame 225 may include a plurality of coupling protrusions 2251 or a plurality of holes 2252. According to an embodiment, the plurality of coupling protrusions 2251 may be integrally formed to the rotor frame 225 by press processing. According to an embodiment, the plurality of coupling protrusions 2251 may protrude toward the clutch 250 to be engaged with the movable member 260 of the clutch 250 when the rotor 220 and the clutch 250 are coupled.

According to an embodiment, the plurality of coupling protrusions 2251 may be disposed on the edge side of the second part 225*b* to be adjacent to the third part 225*c* of the rotor frame 225. According to an embodiment, the plurality of coupling protrusions 2251 may be formed in one area of the second part 225*b* corresponding to (or facing) the second locking recess 261*b* of the movable member 260. According to an embodiment, the plurality of coupling protrusions 2251 may be disposed to be spaced apart from each other at regular intervals along the circumferential direction of the second part 225*b*. For example, the plurality of coupling protrusions 2251 may be disposed at regular intervals along the circumference C having a predetermined radius from the central axis (e.g., rotational axis R) of the rotor frame 225.

According to an embodiment, one end (e.g., a fixed end) of the coupling protrusion 2251 may come into contact with the hole 2252 corresponding to the coupling protrusion 2251 among the plurality of holes 2252. According to an embodiment, the coupling protrusion 2251 may be formed by bending in a direction (e.g., −W direction) perpendicular to the corresponding hole 2252. For example, the coupling protrusion 2251 may be formed by bending in a radial direction of the rotational axis R from the corresponding hole 2252. According to an embodiment, the plurality of holes 2252 may be formed by the plurality of coupling protrusions 2251 formed by press working. According to an embodiment, the plurality of holes 2252 may be formed in a shape corresponding to the plurality of protrusions 2251. According to an embodiment, the plurality of holes 2252 may extend in the radial direction of the rotational axis R by the plurality of protrusions 2251. According to an embodiment, the plurality of holes 2252 may suppress heat generation of the reduction gear 270. For example, the plurality of holes 2252 may reduce the temperature of the reduction gear 270 by dissipating the heat generated in the motor assembly 201 during operation of the clothing treatment device 100 to the outside.

According to an embodiment, a damper 280 may be coupled to the rotor frame 225. For example, the damper 280 may be fitted into at least one of the plurality of holes 2252. According to an embodiment, the damper 280 may mitigate the shock generated when the rotor 220 and the clutch 250 are coupled. For example, the damper 280 is disposed to first contact the movable member 260 of the clutch 250 when the clutch 250 and the rotor 220 are coupled, performing cushioning between the coupling protrusions 2251 of the rotor frame 225.

Figure 10A:
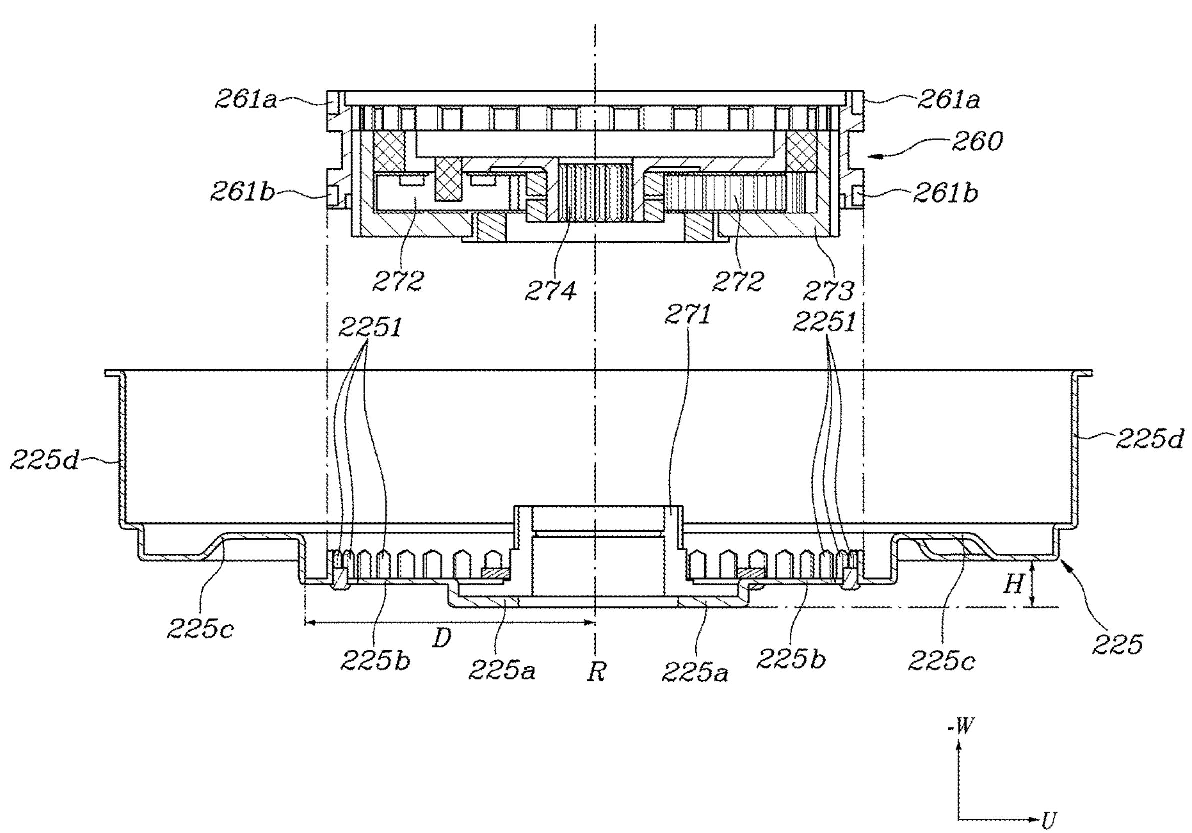
FIG. 10A is a cross-sectional view in a state in which a movable member of a clutch and a rotor frame are separated in a driving device, according to an embodiment of the disclosure.
Figure 10B:
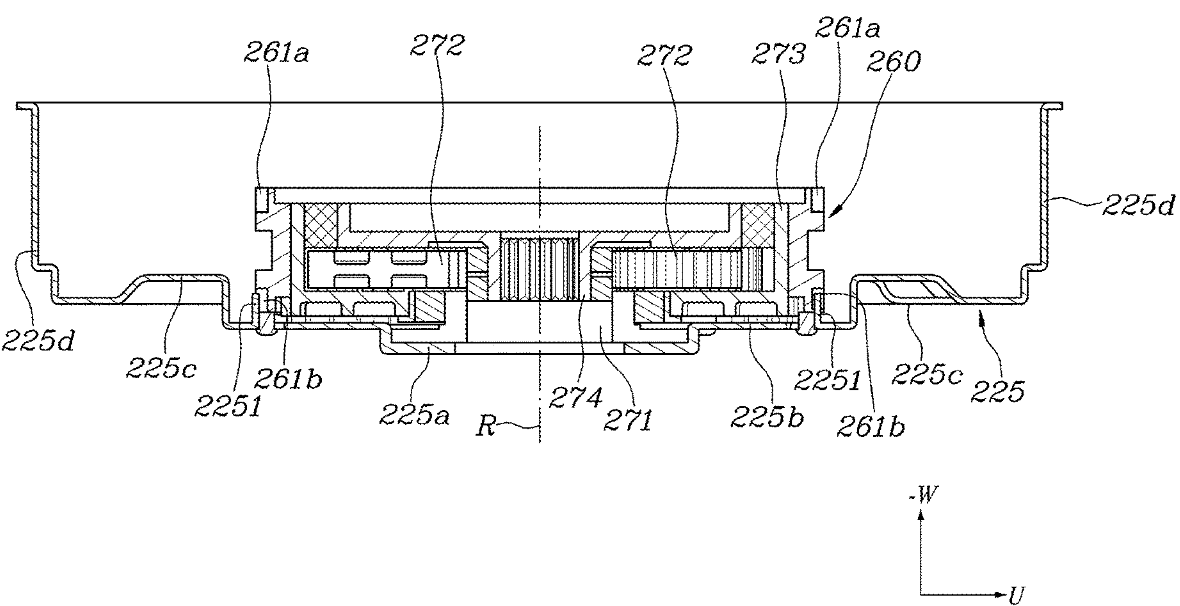
FIG. 10B is a cross-sectional view in a state in which a movable member of a clutch and a rotor frame are coupled in a driving device, according to an embodiment of the disclosure.
Figure 10C:
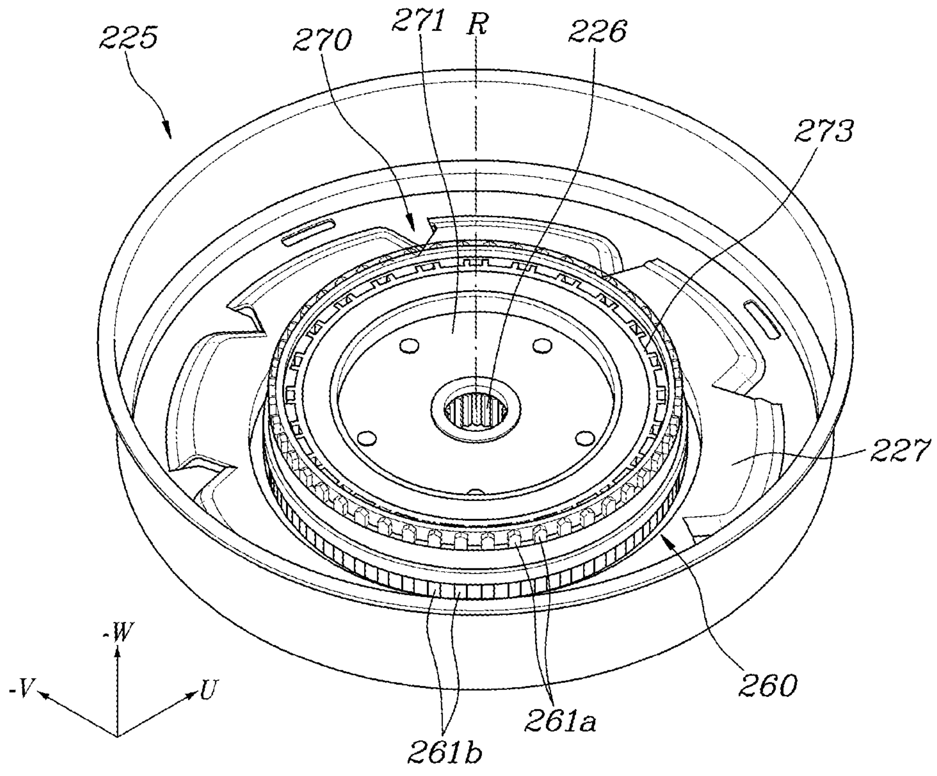
FIG. 10C is a perspective view in a state in which a movable member of a clutch, a reduction gear, and a rotor frame are coupled in a driving device according to an embodiment of the disclosure.

FIG. 10A is a cross-sectional view in a state in which a movable member 260 of a clutch and a rotor frame 225 are separated in a driving device 200, according to an embodiment of the disclosure. FIG. 10B is a cross-sectional view in a state in which a movable member 260 of a clutch and a rotor frame 225 are coupled in a driving device 200, according to an embodiment of the disclosure. FIG. 10C is a perspective view in a state in which a movable member 260 of a clutch, a reduction gear 270, and a rotor frame 225 are coupled in a driving device according to an embodiment of the disclosure. The perspective view shown in FIG. 10C assumes that the driving device 200 in which the movable member 260 of the clutch, the reduction gear 270, and the rotor frame 225 are coupled is viewed in one direction (e.g., W direction).

Referring to FIGS. 10A, 10B, and 10C, in an embodiment, during the spin-drying cycle of the clothing treatment device 100, the movable member 260 of the clutch 250 may slide toward the rotor 220 and, as the locking recess 261*b* of the movable member 260 and the plurality of coupling protrusions 2251 of the rotor frame 225 are engaged with each other, the clutch 250 and the rotor 220 may interlock with each other.

In an embodiment, when the clutch 250 and the rotor 220 are interlocked by the locking recess 261*b* of the movable member 260 and the plurality of engaging protrusions 2251 of the rotor frame 225, if the sun gear 271 is rotated in conjunction with the shaft 50, the internal gear 273 may be rotated in conjunction with the rotor 220. In this case, the plurality of satellite gears 272 may also be rotated in conjunction with the sun gear 271 and the internal gear 273. Accordingly, the drum 20 may perform a spin-drying cycle while rotating at a constant speed without deceleration.

According to an embodiment, the plurality of coupling protrusions 2251 are integrally formed to the rotor frame 225 by press working, rather than being a separate member that is injection-molded, so that the rotor frame 225 may be made thinner. For example, as the plurality of protrusions are integrally formed to the rotor frame 225 by press working, it is possible to minimize bolting for fastening an injection-molded article and reduce the height H of the rotor frame. As integrally formed to the plurality of protruding rotor frames 225 by press working, the margin required during injection molding becomes unnecessary, so that the volume of the rotor frame 225 may be reduced (e.g., the radius D of the second part 225*b* reduces). As a result, as the plurality of protrusions are integrally formed to the rotor frame by press working, the overall size of the rotor frame 225 may be reduced as compared to an injection-molded structure.

Figure 11A:
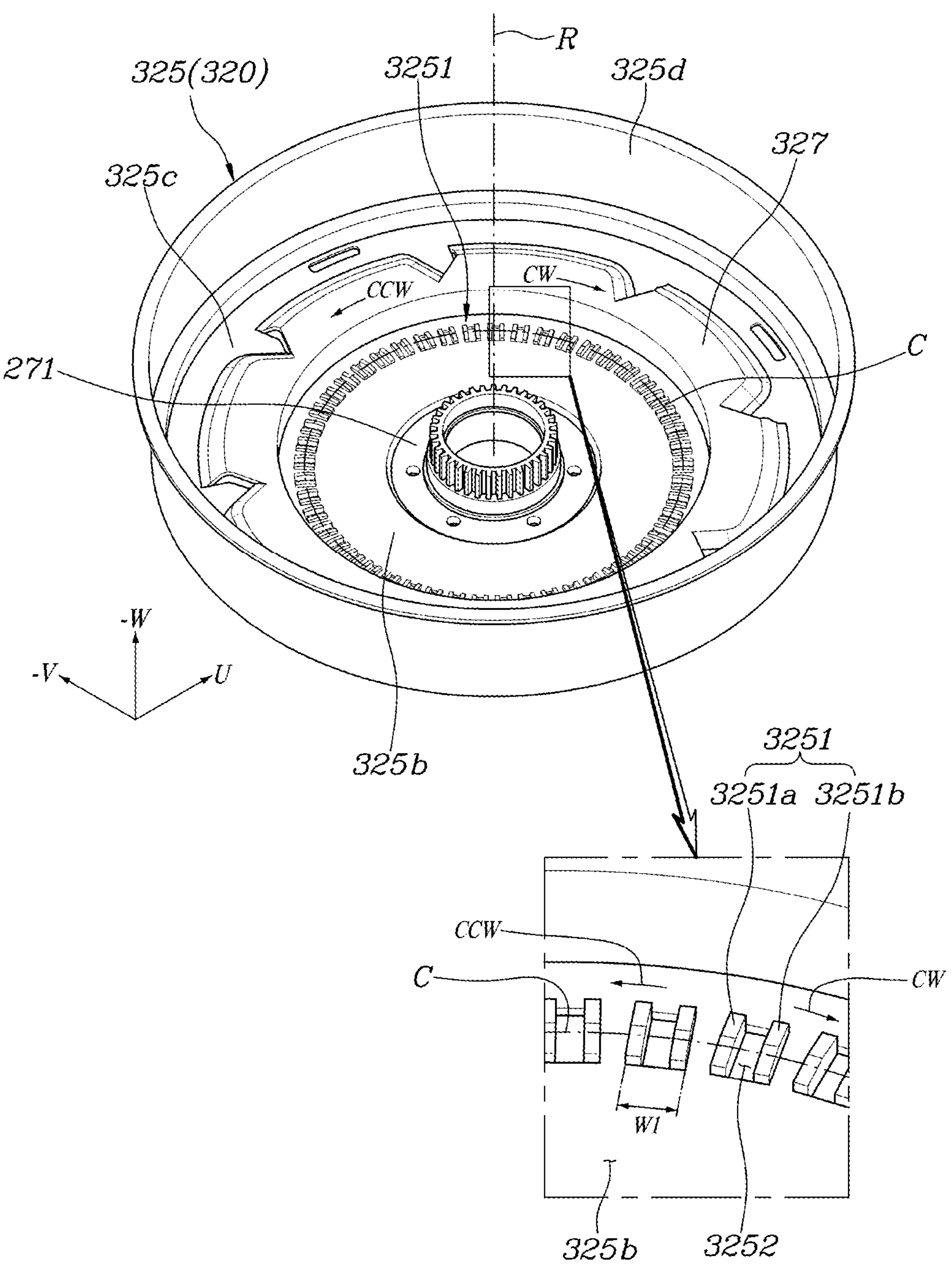
FIG. 11A is a whole or partial perspective view illustrating a rotor frame constituting a driving device according to an embodiment of the disclosure.
Figure 11B:
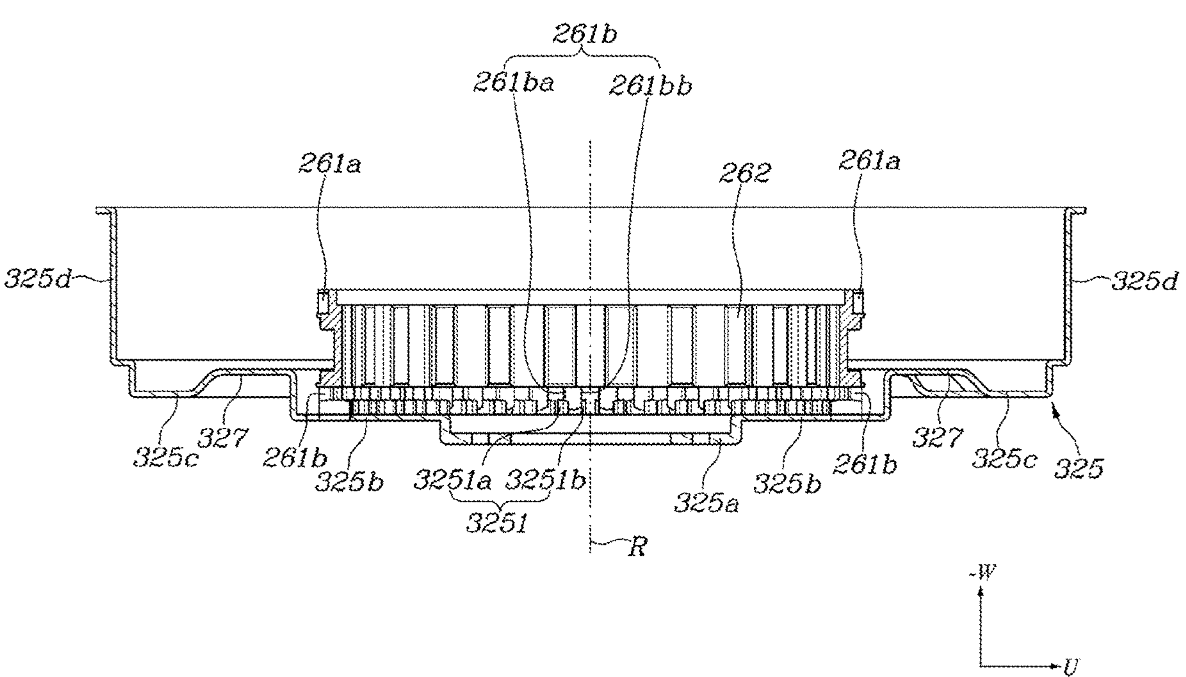
FIG. 11B is a cross-sectional view in a state in which the rotor frame and the clutch movable member are coupled in FIG. 11A.

FIG. 11A is a whole or perspective view illustrating a rotor frame constituting a driving device according to an embodiment of the disclosure. FIG. 11B is a cross-sectional view in a state in which the rotor frame and the clutch movable member are coupled in FIG. 11A.

Referring to FIGS. 11A and 11B, the rotor frame 325 according to an embodiment may include a first part 325*a*, a second part 325*b*, a third part 325*c* or a fourth part 325*d*. In the following description, the first part 325*a*, the second part 325*b*, the third part 325*c* or the fourth part 325*d* included in the rotor frame 325 have substantially the same or similar structure as the first part 225*a*, the second part 225*b*, the third part 225*c* or the fourth part 225*d* included in the rotor frame 225 according to the above-described embodiment and are thus omitted from the detailed description except for the differences for convenience of description.

In an embodiment, the plurality of coupling protrusions 3251 may be formed by bending in the circumferential direction of the circumference C. According to an embodiment, the plurality of coupling protrusions 3251 may be bent to face each other along the circumference C with respect to each of the plurality of holes 3252, form one pair 3251*a* and 3251*b*. According to an embodiment, the plurality of coupling protrusions 3251 may include a first coupling protrusion 3251*a* or second coupling protrusion 3251*b*. For example, the first coupling protrusion 3251*a* may be formed by vertically bending to one side (e.g., in a counterclockwise direction (CCW)) from one hole 3252. For example, the second coupling protrusion 3251*b* may be formed by vertically bending to the other side (e.g., in a clockwise direction (CW)) from the hole 3252. The hole 3252 may be positioned between the first coupling protrusion 3251*a* and the second coupling protrusion 3251*b*. The first coupling protrusion 3251*a* and the second coupling protrusion 3251*b* may be symmetrical to each other with respect to the hole 3252.

According to an embodiment, when the rotor 320 and the clutch 250 are coupled, the plurality of coupling protrusions 3251 of the rotor frame 225 and the second locking recess 261*b* of the movable member 260 may be engaged with each other, so that the rotor frame 225 of the rotor 320 and the movable member 260 of the clutch 250 may be interlocked. According to an embodiment, when the rotor 320 and the clutch 250 are coupled, the second locking recess 261*b* of the movable member 260 may be interposed between the first coupling protrusion 3251*a* and the second coupling protrusion 3251*b*. According to an embodiment, when the rotor 320 and the clutch 250 are coupled, the first coupling protrusion 3251*a* and the second coupling protrusion 3251*b* of the rotor frame 325 may contact the locking recess 261*b* of the movable member 260. For example, when the rotor 320 and the clutch 250 are coupled, the first coupling protrusion 3251*a* may contact one side surface 261*ba* of the second locking recess 261*b*. For example, when the rotor 320 and the clutch 250 are coupled, the second coupling protrusion 3251*b* may contact the other side surface 261*bb* of the second locking recess 261*b*. Accordingly, when the rotor 320 and the clutch 250 are coupled, the second locking recess 261*b* may be interposed between the pair of protrusions 3251*a* and 3251*b*, enhancing the fastening strength between the rotor 320 and the clutch 250.

Figure 12A:
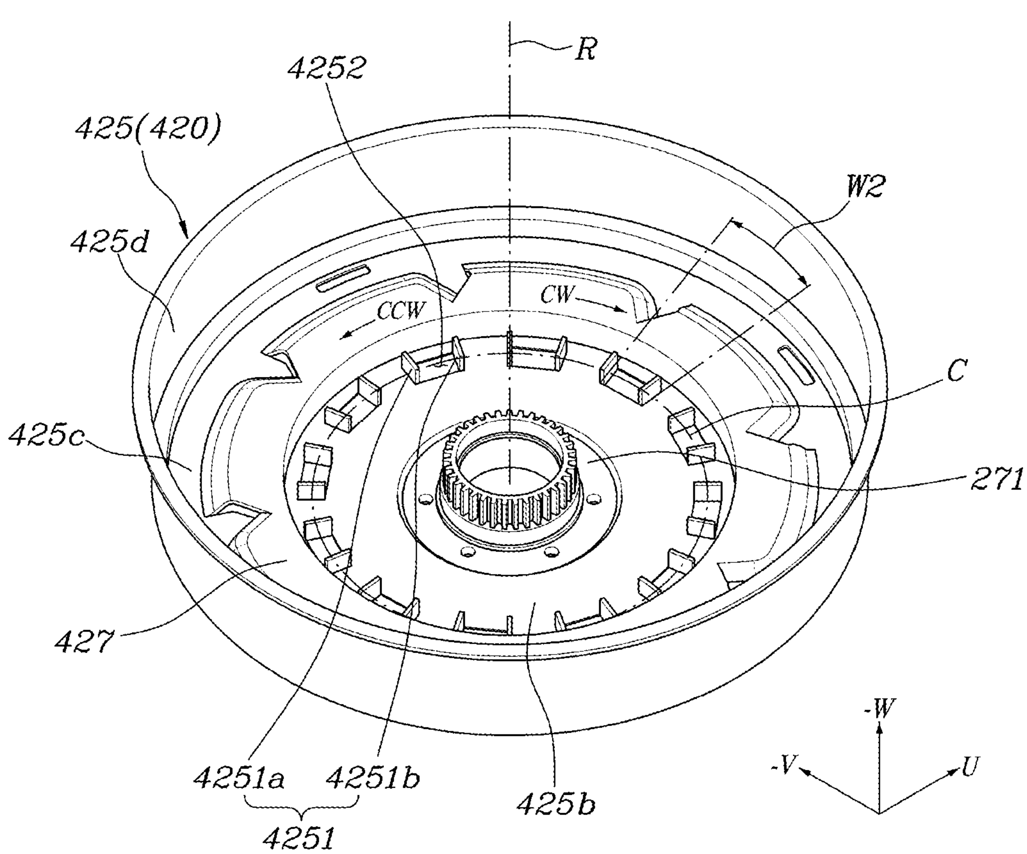
FIG. 12A is a whole or partial perspective view illustrating a rotor frame in a driving device according to an embodiment of the disclosure.
Figure 12B:
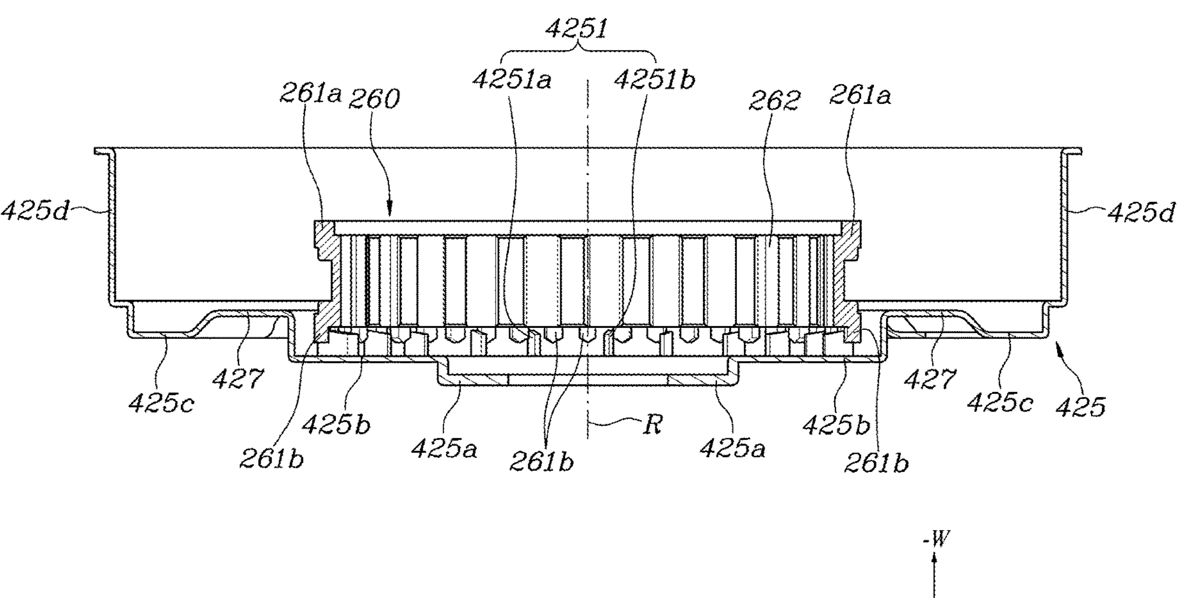
FIG. 12B is a cross-sectional view in a state in which the rotor frame and the clutch movable member are coupled in FIG. 12A according to an embodiment of the disclosure.

FIG. 12A is a whole or partial perspective view illustrating a rotor frame in a driving device according to an embodiment of the disclosure. FIG. 12B is a cross-sectional view in a state in which the rotor frame and the clutch movable member are coupled in FIG. 12A.

Referring to FIGS. 12A and 12B, the rotor frame 425 according to an embodiment may include a first part 425*a*, a second part 425*b*, a third part 425*c* or a fourth part 425*d*. In the following description, the first part 425*a*, the second part 425*b*, the third part 425*c* or the fourth part 425*d* included in the rotor frame 325 have substantially the same or similar structure as the first part 225*a*, the second part 225*b*, the third part 225*c* or the fourth part 225*d* included in the rotor frame 225 according to the above-described embodiment and are thus omitted from the detailed description except for the differences for convenience of description.

In an embodiment, the plurality of coupling protrusions 4251 may be formed by bending in the circumferential direction of the circumference C. According to an embodiment, the plurality of coupling protrusions 4251 may be bent to face each other along the circumference C with respect to each of the plurality of holes 4252, form one pair 4251*a* and 4251*b*. According to an embodiment, the plurality of coupling protrusions 4251 may include a first coupling protrusion 4251*a* and second coupling protrusion 4251*b*. For example, the first coupling protrusion 4251*a* may be formed by vertically bending to one side (e.g., in a counterclockwise direction (CCW)) from one hole 4252. For example, the second coupling protrusion 4251*b* may be formed by vertically bending to the other side (e.g., in a clockwise direction (CW)) from the hole 4252. The hole 4252 may be positioned between the first coupling protrusion 4251*a* and the second coupling protrusion 4251*b*. The first coupling protrusion 4251*a* and the second coupling protrusion 4251*b* may be symmetrical to each other with respect to the hole 4252.

Referring back to FIG. 11A, the spacing w2 between the plurality of coupling protrusions 4251 in the rotor frame 425 of FIG. 12A may be larger than the spacing w1 between the plurality of coupling protrusions 3251 in the rotor frame 325 of FIG. 11A.

According to an embodiment, when the rotor 420 and the clutch 250 are coupled, the plurality of coupling protrusions 4251 of the rotor frame 425 and the second locking recess 261*b* of the movable member 260 may be engaged with each other, so that the rotor frame 425 of the rotor 420 and the movable member 260 of the clutch 250 may be interlocked. According to an embodiment, when the rotor 420 and the clutch 250 are coupled, at least two or more second locking recesses 261*b* of the movable member 260 may be interposed between the first coupling protrusion 4251*a* and the second coupling protrusion 4251*b*. According to an embodiment, when the rotor 420 and the clutch 250 are coupled, the first coupling protrusion 4251*a* and the second coupling protrusion 3251*b* of the rotor frame 425 may contact the locking recess 261*b* of the movable member 260. For example, the first coupling protrusion 4251*a* may contact one side surface of any one of the second locking recesses 261*b* interposed between the pair of coupling protrusions 4521*a* and 4521*b*, and the second coupling protrusion 4521*b* may contact one side surface of the other of the second locking recesses 261*b* interposed between the pair of coupling protrusions 4521*a* and 4521*b*. Accordingly, when the rotor 220 and the clutch 250 are coupled, the alignment of the clutch 250 may be guided by the plurality of coupling protrusions 4251, so that it is possible to facilitate coupling between the rotor 220 and the clutch 250 while reducing the noise generated when coupled.

The terms as used herein are provided merely to describe some embodiments thereof, but are not intended to limit the disclosure. As used herein, the singular forms "a," "an," and "the" are intended to include the plural forms as well, unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

As used herein, the terms "configured to" may be interchangeably used with the terms "suitable for," "having the capacity to," "designed to," "adapted to," "made to," or "capable of" depending on circumstances. The term "configured to" does not essentially mean "specifically designed in hardware to." Rather, the term "configured to" may mean that a device can perform an operation together with another device or parts. For example, a 'device configured (or set) to perform A, B, and C' may be a dedicated device to perform the corresponding operation or may mean a general-purpose device capable of various operations including the corresponding operation.

Meanwhile, the terms "upper side", "lower side", and "front and rear directions" used in the disclosure are defined with respect to the drawings, and the shape and position of each component are not limited by these terms.

In the disclosure, the above-described description has been made mainly of specific embodiments, but the disclosure is not limited to such specific embodiments, but should rather be appreciated as covering all various modifications, equivalents, and/or substitutes of various embodiments.

What is claimed is:

1. A driving device, comprising:
a stator;
a rotor including a rotor frame and provided to be rotatable about a rotational axis of a clothing treatment device through interaction with the stator; and
a clutch including:
a movable member, including a locking recess, configured to slide along the rotational axis to be selectively coupled to the rotor according to an operation mode of the clothing treatment device,
wherein the rotor frame includes:
a plurality of holes, and
a plurality of coupling protrusions protruding toward the clutch so as to be coupled with the locking recess of the movable member along a radial direction of the rotor frame based on the movable member being slid to be coupled to the rotor, and
wherein the plurality of coupling protrusions are integrally formed with the rotor frame and punched out of the rotor frame to form the plurality of holes, and
the plurality of coupling protrusions are inserted into the locking recess.

2. The driving device of claim 1, wherein
the plurality of coupling protrusions are formed in a vertical direction relative to the plurality of holes, and a side of a coupling protrusion among the plurality of coupling protrusions contacts a side of a hole among the plurality of holes which the coupling protrusion was punched out to form.

3. The driving device of claim 1, wherein the plurality of coupling protrusions are arranged to be spaced apart at a predetermined interval along a circumference having a predetermined radius around a central axis of the rotor frame.

4. The driving device of claim 1, wherein the plurality of holes are formed along a circumference having a predetermined radius from a central axis of the rotor frame, the plurality of coupling protrusions are formed in a vertical direction relative to the plurality of holes, and a side of a coupling protrusion among the plurality of coupling protrusions contacts an outer side of a hole among the plurality of holes which the coupling protrusion was punched out to form.

5. The driving device of claim 1, wherein the plurality of coupling protrusions are formed so as to be spaced apart at a predetermined interval along a circumference having a predetermined radius from a central axis of the rotor frame, and arranged in pairs so that a side of each coupling protrusion of a pair of coupling protrusions respectively contacts opposite sides of a hole of the plurality of holes which the pair of the coupling protrusions were punched out to form.

6. The driving device of claim 5, wherein each pair of the pairs of the coupling protrusions includes a first coupling protrusion and a second coupling protrusion, and the locking recess is among a plurality of locking recesses of the movable member that are each formed with a first side surface and a second side surface to respectively contact the first coupling protrusion and the second coupling protrusion of one of the pairs of the coupling protrusions when the movable member is coupled to the rotor.

7. The driving device of claim 5, wherein each pair of the pairs of the coupling protrusions includes a first coupling protrusion and a second coupling protrusion, and the locking recess is among a plurality of locking recesses of the movable member that are disposed so that each locking recess of the plurality of locking recesses is interposed between the first coupling protrusion and the second coupling protrusion of one of the pairs of the coupling protrusions when the movable member is coupled to the rotor.

8. The driving device of claim 1, further comprising:

a damper fitted into at least one hole of the plurality of holes.

9. The driving device of claim 8, wherein the damper is disposed to perform a cushioning action between the plurality of coupling protrusions formed in the rotor frame, and the movable member provided in the clutch, when the clutch is coupled to the rotor.

10. The driving device of claim 1, wherein the locking recess which is among a plurality of locking recesses, and during a spin-drying operation, the movable member is slid toward the rotor so that the clutch and the rotor are interlocked, and the plurality of coupling protrusions formed in the rotor frame are engaged with the plurality of locking recesses of the movable member.

11. A driving device, comprising:

a stator;

a rotor provided to be rotatable about a rotational axis of a clothing treatment device through interaction with the stator;

an insulator configured to surround at least a portion of the stator;

a clutch including:

a movable member, including a locking recess, configured to slide along the rotational axis to be selectively coupled to, and uncoupled from, the rotor according to an operation mode of the clothing treatment device; and a non-movable member configured to slide the movable member and including a fixing case fixed to the insulator, and at least one of a clutch coil and a clutch magnet disposed inside of the fixing case, a fixing member protruding and extending from an upper surface of the insulator toward the clutch; and a fixing area disposed in the fixing case of the non-movable member and formed to be open to have the fixing member pass therethrough, wherein the insulator includes:

a coupling area to receive the clutch, and a connection member provided in the coupling area and configured to protrude from an inner circumference of the insulator toward the rotational axis so as to be inserted into the locking recess of the movable member based on the movable member being slid to be uncoupled from the rotor, and wherein the fixing member is formed integrally with the insulator and fixes the insulator and the fixing case of the non-movable member.

12. The driving device of claim 11, wherein the connection member includes a plurality of protrusions, and the plurality of protrusions are arranged to be spaced apart from each other in a circumferential direction surrounding the rotational axis.

13. The driving device of claim 11, wherein the insulator is injection-molded to be integrally configured with the connection member.

14. The driving device of claim 11, wherein, during a washing operation, the movable member is slid toward the insulator, and the connection member is engaged with the locking recess of the movable member.

15. A driving device, comprising:

a stator;

a rotor including a rotor frame and provided to be rotatable about a rotational axis of a clothing treatment device through interaction with the stator;

an insulator configured to surround at least a portion of the stator; and a clutch including:

a movable member, including a locking recess, configured to slide along the rotational axis to be selectively coupled to, and uncoupled from, the rotor according to an operation mode of the clothing treatment device, wherein the rotor frame includes:

a plurality of holes, and a plurality of coupling protrusions protruding toward the clutch so as to be coupled with the movable member along a radial direction of the rotor frame based on the movable member being slid to be coupled to the rotor, and wherein the plurality of coupling protrusions are integrally formed with the rotor frame and punched out of the rotor frame to form the plurality of holes, and the plurality of coupling protrusions are inserted into the locking recess, wherein the insulator includes:

a coupling area open inwardly from an upper surface to receive the clutch, and a connection member provided in the coupling area and configured to protrude an inner circumference of the insulator toward the rotational axis so as to be inserted into the locking recess of the movable member based on the movable member being slid to be uncoupled from the rotor.

16. The driving device of claim 15, wherein the plurality of coupling protrusions are formed in a vertical direction relative to the plurality of holes, and a side of a coupling protrusion among the plurality of coupling protrusions contacts a side of a hole among the plurality of holes which the coupling protrusion was punched out to form.

17. The driving device of claim 15, wherein the plurality of coupling protrusions are formed so as to be spaced apart at a predetermined interval along a circumference having a predetermined radius from a central axis of the rotor frame, and arranged in pairs so that a side of each coupling protrusion of a pair of coupling protrusions among the plurality of coupling protrusions respectively contacts opposite sides of a hole of the plurality of holes which the pair of the coupling protrusions were punched out to form.

18. The driving device of claim 15, wherein the insulator is configured so an area surrounding the stator and extending to the coupling area including the connection member is injection-molded so as to be integrally configured.

19. The driving device of claim 15, further comprising:

a fixing member protruding and extending from an upper surface of the insulator toward the clutch; and a fixing area disposed in the clutch and formed to be open to have the fixing member pass therethrough to fix a portion of the clutch to the insulator.

* * * * *